US011938390B2

(12) United States Patent
Moran

(10) Patent No.: US 11,938,390 B2
(45) Date of Patent: Mar. 26, 2024

(54) SPORTS BALL TRAINING OR SIMULATING DEVICE

(71) Applicant: Matthew Moran, Vernon, NY (US)

(72) Inventor: Matthew Moran, Vernon, NY (US)

(73) Assignee: Matthew Moran, Vernon, NY (US)

( * ) Notice: Subject to any disclaimer, the term of this patent is extended or adjusted under 35 U.S.C. 154(b) by 0 days.

(21) Appl. No.: 17/353,773

(22) Filed: Jun. 21, 2021

(65) Prior Publication Data

US 2021/0308546 A1 Oct. 7, 2021

Related U.S. Application Data

(63) Continuation-in-part of application No. 16/448,938, filed on Jun. 21, 2019, now Pat. No. 11,040,262, and
(Continued)

(51) Int. Cl.
*A63B 69/36* (2006.01)
*A63B 69/00* (2006.01)
(Continued)

(52) U.S. Cl.
CPC ...... *A63B 69/0091* (2013.01); *A63B 69/3661* (2013.01); *A63B 71/0622* (2013.01);
(Continued)

(58) Field of Classification Search
CPC ............ A63B 69/0091; A63B 69/3661; A63B 71/0622; A63B 69/002; A63B 2071/0694;
(Continued)

(56) References Cited

U.S. PATENT DOCUMENTS 2,362,064 A 11/1944 Giesinger
2,656,720 A 10/1953 Sonnett
(Continued)

FOREIGN PATENT DOCUMENTS

CN 201058221 Y 5/2008
CN 104707332 6/2015
(Continued)

OTHER PUBLICATIONS

Shu, Les, "Adidas' new Bluetooth soccer ball analyzes your kicks to help improve your game", Digital Trends, Jun. 12, 2014, Date Accessed: Jun. 18, 2019. https://www.digitaltrends.com/health-fitness/adidas-new-bluetooth-soccer-ball-analyzes-kicks-help-improve-game/.
(Continued)

*Primary Examiner* — Nini F Legesse
(74) *Attorney, Agent, or Firm* — Eschweiler & Potashnik, LLC

(57) ABSTRACT

A ball training or simulating device is provided. The ball training or simulating device comprises a modified ball coupled to a base by a motion transfer member. The modified ball allows for a lower, more natural, ball position, while the shape, position, and configuration of the motion transfer member provide for a verisimilar kicking experience. The ball training and/or simulating device can be coupled to a computing device to allow input from the modified ball to be used in a simulated or augmented reality game. A computer-implemented method for conducting a virtual, augmented, or mixed reality game is also provided.

18 Claims, 21 Drawing Sheets

Related U.S. Application Data a continuation-in-part of application No. PCT/US2020/038969, filed on Jun. 22, 2020.

(51) Int. Cl.
*A63B 71/06* (2006.01)
*A63F 13/812* (2014.01)

(52) U.S. Cl.
CPC ..... *A63B 69/002* (2013.01); *A63B 2071/0694* (2013.01); *A63F 13/812* (2014.09); *A63F 2300/8011* (2013.01)

(58) Field of Classification Search
CPC ............ A63B 2209/08; A63B 2220/80; A63B 2220/833; A63F 13/812; A63F 2300/8011; A63F 13/218; A63F 13/245; A63F 13/98
USPC ................ 473/139, 397, 419, 420, 423, 446
See application file for complete search history.

(56) References Cited

U.S. PATENT DOCUMENTS

| | | | |
|---|---|---|---|
| 3,292,436 | A | 12/1966 | Bahnsen |
| 3,526,991 | A | 9/1970 | Goldfarb et al. |
| 4,120,489 | A | 10/1978 | Borlinghaus |
| 4,440,400 | A * | 4/1984 | Neuberger ............ A63B 69/224 482/84 |
| 4,577,865 | A | 3/1986 | Shishido |
| 4,641,834 | A * | 2/1987 | Hegedus ............ A63B 69/0091 473/446 |
| 5,037,113 | A | 8/1991 | Sowards |
| 5,280,922 | A * | 1/1994 | Jones ................ A63B 69/0084 473/426 |
| 5,435,572 | A | 7/1995 | Covel |
| 5,613,678 | A | 3/1997 | McKee et al. |
| 5,810,685 | A | 9/1998 | Willner et al. |
| 5,951,414 | A | 9/1999 | Sowards |
| 6,149,520 | A | 11/2000 | Takatsuka |
| 6,195,104 | B1 | 2/2001 | Lyons |
| D556,275 | S | 11/2007 | Crane et al. |
| D562,419 | S | 2/2008 | Crane et al. |
| D687,606 | S | 8/2013 | Burger |
| 8,758,172 | B2 | 6/2014 | Creguer |
| D740,898 | S | 10/2015 | Westrom et al. |
| 9,384,676 | B2 | 7/2016 | Costain et al. |
| 9,776,047 | B2 | 10/2017 | Krysiak et al. |
| 11,040,262 | B2 | 6/2021 | Moran |
| 2004/0248661 | A1 | 12/2004 | O'Mahony |
| 2006/0270483 | A1* | 11/2006 | O'Mahony ........ A63B 24/0021 473/149 |
| 2006/0293124 | A1 | 12/2006 | Mooney |
| 2008/0180898 | A1 | 7/2008 | Henderson |
| 2009/0069123 | A1 | 3/2009 | Nugent |
| 2012/0122634 | A1 | 5/2012 | Lee |
| 2012/0319989 | A1* | 12/2012 | Argiro .................. A63F 13/428 345/173 |
| 2013/0278494 | A1 | 10/2013 | Huang et al. |
| 2014/0274483 | A1 | 9/2014 | Ragen |
| 2015/0054632 | A1 | 2/2015 | Ezra |
| 2016/0375334 | A1* | 12/2016 | Ragen ................ A63B 69/0073 473/429 |
| 2017/0266528 | A1 | 9/2017 | Westrom et al. |
| 2018/0200583 | A1 | 7/2018 | Thurman et al. |
| 2019/0126125 | A1 | 5/2019 | Kudirka et al. |

FOREIGN PATENT DOCUMENTS

| | | |
|---|---|---|
| DE | 202019102236 U1 | 6/2019 |
| WO | 9101779 A1 | 2/1991 |
| WO | 2008018773 A2 | 2/2008 |
| WO | 2014042402 A2 | 3/2014 |
| WO | 2016058064 A1 | 4/2016 |
| WO | 20180218253 A1 | 11/2018 |
| WO | 2020257775 A9 | 12/2020 |

OTHER PUBLICATIONS

Osborne, Doug, "Virtual Soccer Ball counts how good your soccer skills are", Geek.com, Apr. 27, 2009, Date Accessed: Jun. 18, 2019. https://www.geek.com/games/virtual-soccer-ball-counts-how-good-your-soccer-skills-are-755162/.

Namco, "World Kicks Operators Manual", 1999, Date Accessed: Jun. 18, 2019. https://www.gamesdatabase.org/Media/SYSTEM/Arcade/Manual/formated/World_Kicks_-_2000_-_Capcom.pdf.

Mitcalc, "Springs", Date Accessed: Jun. 18, 2019. http://www.mitcalc.com/doc/springs/help/en/springs.htm.

Katz, David A., "Chemistry in the Toy Store 6th Edition", 2002, Date Accessed: Jun. 18, 2019. http://chymist.com/Toystore%20part2.pdf.

Truestrike, "Driving Range", Date Accessed: Jun. 18, 2019. https://www.truestrike.com/driving-range-mats/.

D.W. Quail Golf, "Golf Mats, Nets, and Mirrors", Date Accessed: Jun. 18, 2019. https://dwquailgolf.com/golf-mats-nets-and-mirrors/.

Tour Greens, "Synthetic Turf Hitting Mats", Date Accessed: Jun. 18, 2019. https://www.tourgreens.com/synthetic-turf-hitting-mats.html.

Range Servant, "Golf Driving Range Mats", Date Accessed: Jun. 18, 2019, https://rangeservant.us/product-category/golf-range-accessories/golf-range-mats/.

Nagarajan, et al., "Design and Experimental Evaluation of Double Pig Tail Double Conical Spring Parameters (Abstract)", SAE Technical Paper 2013-26-0037, 2013. https://doi.org/10.4271/2013-26-0037.

Paredes, et al., "Optimal design of conical springs (Abstract)", Engineering with Computers, 2009, vol. 25, Issue 147, Springer-Verlag. https://doi.org/10.1007/s00366-008-0112-3.

Popfoam, "About", Date Accessed: Jun. 18, 2019. http://www.popfoam.com/about/.

Popfoam, "Materials", Date Accessed: Jun. 18, 2019. http://www.popfoam.com/materials/.

Popfoam, "Process", Date Accessed: Jun. 18, 2019. http://www.popfoam.com/process/.

Knapp, Gwen, "Building a Better Futbol", Sports on Earth, Jun. 19, 2013, Date Accessed: Jun. 18, 2019. http://www.sportsonearth.com/article/51102524/the-one-world-futbol-invented-by-tim-jahnigen-brings-recreation-to-impoverished-nations.

Bloom, Taylor, "The One World Futbol Project. A Technological Innovation that Could Touch the Lives of Millions", SportTechie, Apr. 8, 2013, Date Accessed: Jun. 18, 2019. https://www.sporttechie.com/the-one-world-futbol-project-a-technological-innovation-that-could-touch-the-lives-of-millions/.

Mueller, et al., "Breakout for Two", Media Lab Europe, Date Accessed: Jun. 18, 2019. https://web.media.mit.edu/~stefan/hc/handouts/BreakoutForTwo.pdf.

Machine Translation of WO2016058064A1 (4 pages).

Machine Translation of WO2014042402A2 (11 pages).

Machine Translation of CN104707332 (9 pages).

Legesse, Nini F., "Office Action for U.S. Appl. No. 16/448,938", dated May 15, 2020, 11 pages.

PCT Patent Office, "Invitation to Pay Additional Fees and, Where Applicable, Protest Fee", dated Aug. 11, 2020, 2 pages.

Legesse, Nini F., "Notice of Allowance for U.S. Appl. No. 16/448,938", dated Feb. 19, 2021, 6 pages.

Thomas, Shane, "International Search Report and Written Opinion for PCT Patent Application No. PCT/US20/38969", dated Feb. 26, 2021, 11 pages.

Legesse, Nini F., "Corrected Notice of Allowability for U.S. Appl. No. 16/448,938", dated Apr. 7, 2021, 7 pages.

Kong, "Safestix", Retrieved Date: Sep. 9, 2020, Retrieved at: <<https://www.kongcompany.com/dog/material/polytuff/safestix>>, 20 pages.

Norman, Abby, "Researchers Create Soft, Flexible Material That's 5 Times Stronger Than Steel", FUTURISM, Jul. 20, 2017, Retrieved

(56) References Cited

OTHER PUBLICATIONS

Date: Sep. 9, 2020, Retrieved at: <<https://futurism.com/researchers-create-soft-flexible-material-thats-5-times-stronger-than-steel>>, 4 pages.
"Extended European Search Report for European Patent Application No. 20826507.4", dated May 19, 2023, 11 Pages.
Chinese Office Action dated Oct. 20, 2023 in connection with Application Serial No. 202080059076.5.

\* cited by examiner

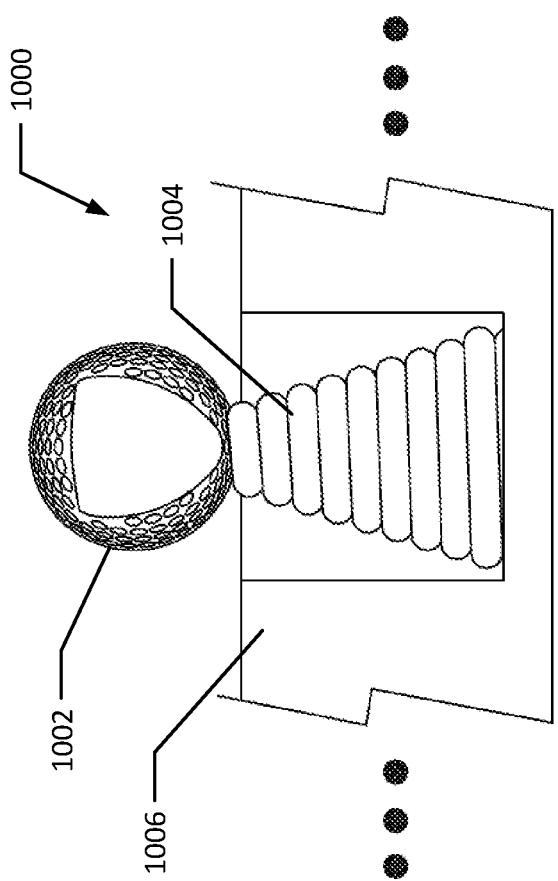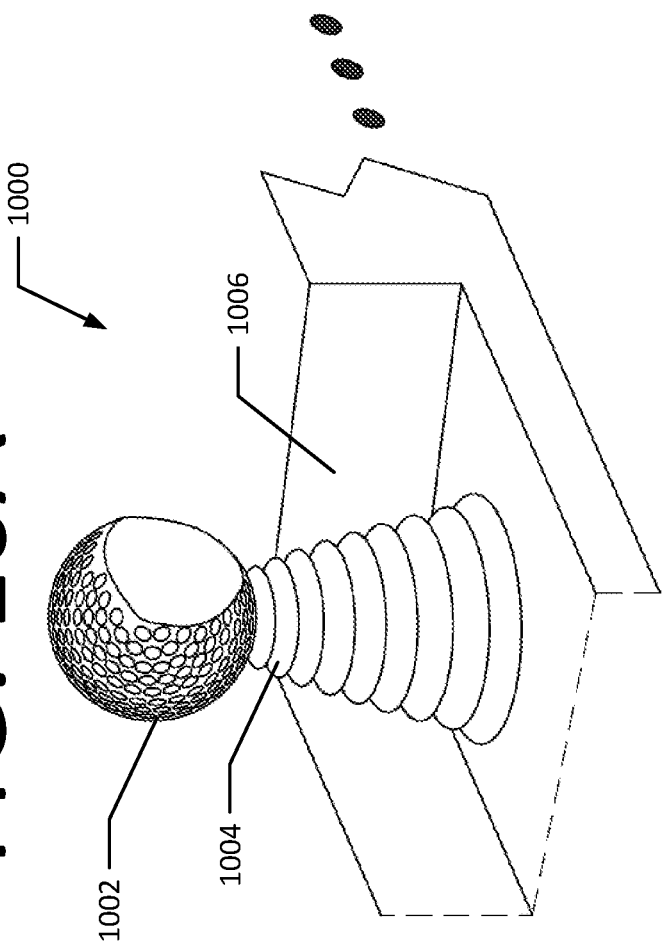

SPORTS BALL TRAINING OR SIMULATING DEVICE

CROSS-REFERENCE TO RELATED APPLICATIONS

This application is a continuation-in-part of U.S. application Ser. No. 16/448,938, filed on Jun. 21, 2019, entitled, "SPORTS BALL TRAINING OR SIMULATING DEVICE". This application is also a continuation-in-part of PCT application PCT/US20/38969, filed Jun. 22, 2020, entitled "SPORTS BALL TRAINING OR SIMULATING DEVICE", which in turn, claimed priority to U.S. application Ser. No. 16/448,938, filed on Jun. 21, 2019, entitled, "SPORTS BALL TRAINING OR SIMULATING DEVICE". These prior applications are incorporated by reference herein.

FIELD

The present disclosure relates generally to sports training devices and simulation input devices.

BACKGROUND

Generally, athletic sports require many bodily motions, however, those who are training or playing sports often have stationary and/or indoor sports training devices, such as speed bags for boxing, golf swing simulators for golfing, or radar guns for baseball pitching. Furthermore, there are many game simulators that provide input for similar motions that are used in real-life sports. Console systems with motion or weight tracking exist, along with many games and simulations from the rapidly growing fields of virtual reality (VR), mixed reality (MR), and augmented reality (AR).

However, issues with many sport training devices occur when addressing relationships between cost, compactness, and verisimilitude of a sports training device. For example, regarding soccer, running can be simulated in a multitude of ways. A large room may be utilized to accommodate for running, this allows for a high degree of verisimilitude, but presents a high level of cost and a low level of compactness. If instead a video game simulates running with an avatar who runs on a screen after a simulated soccer ball, this provides a low degree of verisimilitude, but a relatively low level of cost and a high level of compactness. It is desirable to achieve low costs and high degrees of compactness and verisimilitude. Conventional stationary ball training devices, such as stationary soccer ball training devices, have multiple drawbacks. The drawbacks include not providing a full range of motion when kicking the ball and not providing a natural ball position (e.g., a playing surface that is tangent to the soccer ball). Further, conventional sports ball training devices coupled with augmented reality (AR) capabilities tend to be cumbersome and expensive. In sports that contain prominent skills associated with a player's feet (e.g., skills such as running, ball handling, or kicking), it is desirable to have a compact sport training device that maximizes the realism of skills requiring the use of a foot when training, while still maintaining compact and affordable features.

SUMMARY

The following is a brief summary of subject matter that is described in greater detail herein. This summary is not intended to be limiting as to the scope of the claims.

In an embodiment, a ball training device includes: a motion transfer member mounted vertically and at least partially extending into a modified ball; and a base, coupled to a bottom portion of the motion transfer member. The modified ball is coupled to a top portion of the motion transfer member. The modified ball has a front half with a kicking or striking surface and a back half, the back half being truncated and having a maximum radius less than that of the front half.

In an embodiment, a system includes: a modified ball; a base; and a motion transfer member mounted vertically and at least partially extending into the modified ball. The modified ball is coupled to the base via the motion transfer member. The system also includes: a sensor configured to receive input when a user interacts with the modified ball, and a computing device configured to receive input from the sensor.

In an embodiment, a ball training device includes: a motion transfer member mounted to a modified golf ball; and a base, coupled to a bottom portion of the motion transfer member. The modified golf ball is coupled to a top portion of the motion transfer member. The modified golf ball has a front half with a striking surface and a back half, the back half being truncated and having a maximum radius less than that of the front half.

In an embodiment, a computer-implemented method for virtual, augmented, or mixed reality gaming comprises the steps of: activating a computing device and a tethered input device comprising a ball on a motion transfer member mounted to a base; receiving force and/or directional input from a sensor; processing force and/or directional input to represent force, direction, and/or position of a projectile in an environment; receiving data on a virtual environment, receiving sensor data about a physical environment, or both; processing the force or direction of the projectile or both with the virtual environment data, physical environment data, or both, to compile images in a virtual reality game, augmented reality game, or mixed reality game.

The computer-implemented method of claim 20, wherein the modified ball has a front half with a kicking or striking surface and a back half, the back half being truncated and having a maximum radius less than that of the front half.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE FIGURES

FIG. 10A is a perspective view of an exemplary golf ball training device.

FIG. 10B is a cross-sectional view of the golf ball training device of FIG. 10A.

DETAILED DESCRIPTION

Figure 1:
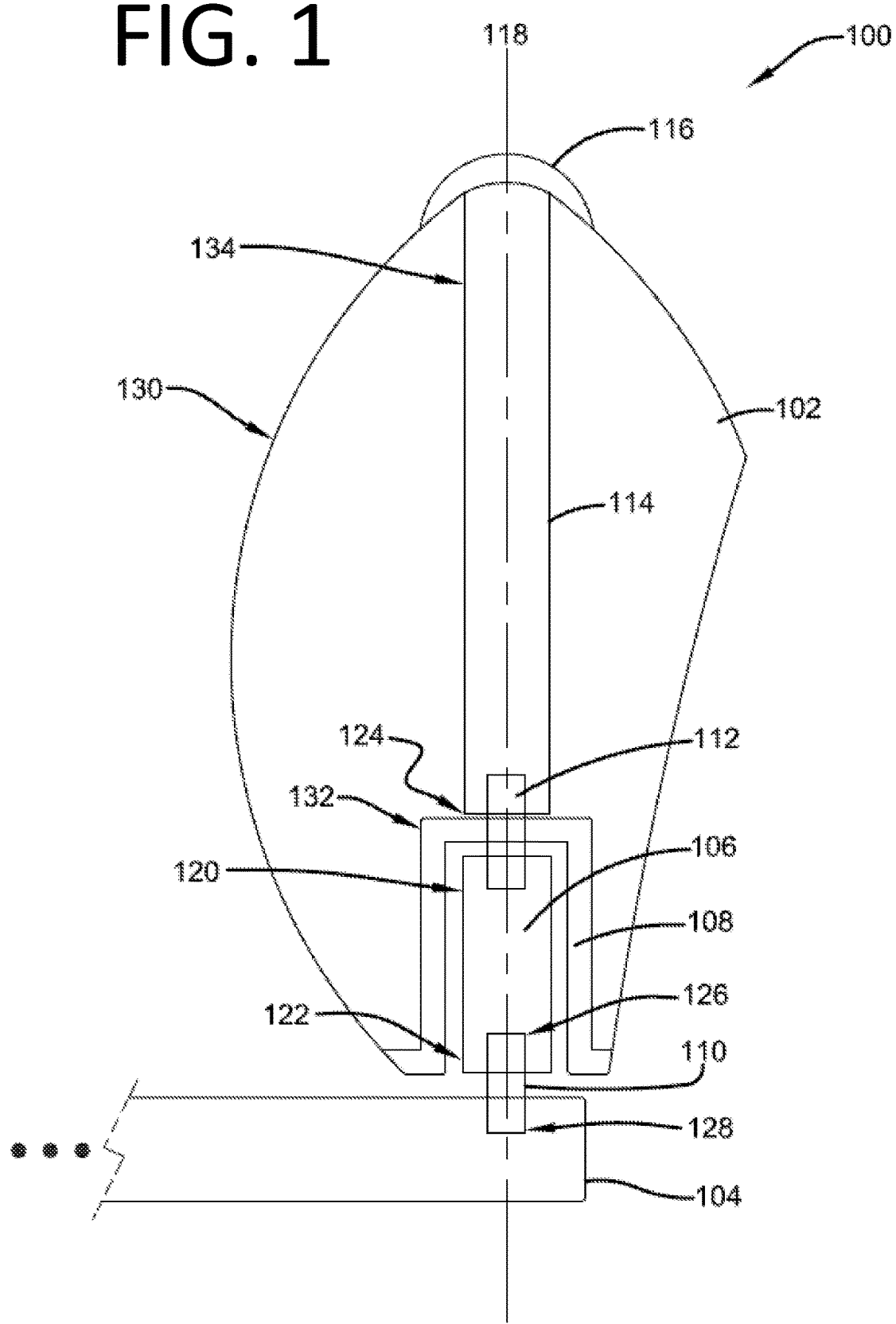
FIG. 1 depicts a cross-sectional view of an exemplary ball training device.

Various technologies pertaining to a sports ball training or simulating device are discussed, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a", "an" and "the", as used in this application and the appended claims, should generally be construed to mean "one or more" unless specified otherwise or clear from the context to be directed to a singular form. Further, as used herein, the term "exemplary" is intended to mean serving as an illustration or example of something and is not intended to indicate a preference.

The present disclosure describes improvements on conventional stationary ball training devices as well as innovative methods of interacting with a sports ball training device. A ball training device generally comprises a ball that is intended to be kicked, a base configured to be set on the ground or the floor, and a motion transfer member that connects the ball to the base. Conventional ball kicking training devices set a ball to an unnaturally high position. In contrast, the apparatus described herein recesses a motion transfer member (e.g., a spring) inside of a modified ball so that the modified ball may be set to a lower, more natural height, that is, a height that is closer to the base. Further, a ball of the apparatus described herein is modified such that there is less material on a backside portion (i.e., a portion of a ball that is opposite to where a kick is to be applied) of a modified ball than a similar conventional ball. The modified ball disclosed herein allows for a fuller range of motion when applying a kick. With the material from the backside of the modified ball removed, it allows the user to kick the ball and follow through without the ball hitting the floor and blocking the foot from following through.

Some sports ball training devices are coupled to a simulation of the sports ball. The simulation can be in the form of augmented reality (AR), virtual reality (VR), mixed reality (MR) or other visual simulations, such as a video game. Conventional sports ball training devices that are coupled to simulations are cumbersome, commonly requiring an entire wall or even an entire room against which a ball maybe kicked or struck. The apparatus disclosed herein allows for a sports ball simulation that provides for a natural feeling kick or strike, a compact profile, portability, and affordability.

With reference now to FIG. 1, a cross-sectional view of an exemplary ball training device 100 is depicted in a general manner. The ball training device 100 comprises a modified ball 102. A modified football is shown in FIG. 1, but other balls, such as, for example, a modified soccer ball, a modified kickball, a modified American football, a modified rugby ball, a modified golf ball may be used. The modified ball 102 may be removably coupled to a base 104 via a motion transfer member 106. The motion transfer member 106 is configured to permit the modified ball 102 to flex or pivot with respect to the base 104. For example, the modified ball 102 can move from an initial position to a second position in response to an external force applied to the modified ball 102. The motion transfer member 106 can be further configured to reset the modified ball 102 from the second position to the initial position. This allows the modified ball 102 to have a range of motion when a force is applied to the modified ball 102. The motion transfer member 106 exerts a repositioning force to move the modified ball 102 back to the initial position along the axis 118. The ball training device 100 further comprises a vertical shaft 114 and a ball coupling device 116 that contributes to a durable, secure attachment, as well as a realistic tactile feel. Without the support of the vertical shaft 114, the top of the modified ball 102 would flex and/or collapse more readily than the bottom. However, in an embodiment, the modified ball 102 may include an internal rib structure to provide additional stiffness extending to the top of the modified ball 102. The rib structure may include numerous ribs running vertically along the interior of the ball. Thus, a kick directed to the top portion of the modified ball 102 without the vertical shaft 114 or internal rib structure could cause it to collapse and not move along a pivot point created by the motion transfer member 106.

In the case of non-spherical balls, such as a football or rugby ball, it should be noted that the modified ball 102, need not be aligned vertically with the axis 118. In some cases, the modified ball 102 may be affixed in a tilted back manner so that when at rest its top point is inclined to the left or right of the axis 118, while the bottom of the modified ball 102 remains on the axis 118.

The motion transfer member 106 is a movable member, such as a movable arm, a tiltable arm, a spring, or an elastomeric cord (either static or tethered). In an embodiment, the motion transfer member 106 is a double conical spring or a single conical spring. In another embodiment, the motion transfer member 106 is a hydraulic arm that pivots about an axis. In another embodiment, the motion transfer member 106 is a series of elastic bands and coupled arms that store energy when a kick or strike is applied, and then release the energy after the kick or strike to bring the modified ball 102 back to an initial starting position. In yet another embodiment, the motion transfer member 106 is a double conical spring that is used in conjunction with an elastic-like material (e.g., latex rubber filled with gelled corn syrup, a flexible polymer, a rubber) which adds reinforcement as well as a means to distribute a force applied to the modified ball 102 when the force ultimately moves the motion transfer member 106. The motion transfer member 106 has a top portion 120 and bottom portion 122. The top portion 120 of the motion transfer member 106 is coupled to a bottom portion 124 of the vertical shaft 114. The bottom portion 122 of the motion transfer member 106 is coupled to the base 104. The motion transfer member 106 extends through an inner portion of the modified ball 102, in this case on a vertical trajectory through the axis 118.

A double conical spring has a thicker mid-section that tapers at terminal ends to a smaller diameter than the mid-section. A double conical spring with a larger diameter in the middle will encourage bending at the mid-section prior to bending at the terminal ends. This provides additional stability and stiffness at the coupling points at the terminal ends and also promotes bending at the mid-section. Conversely, a single conical spring has a flex point closer to the end with the larger diameter, and has a more variable natural movement. Double conical springs, in general, do not have standard design methodologies, analysis, or manufacturing data available. Furthermore, it is difficult to achieve required spring parameters like load at fitted heights, minimized transverse loads, coil diameter, and pitch as double conical springs can have variable pitch, coil diameters, and wire diameters. It is however observed that when the motion transfer member 106 is attached far enough into an interior of the modified ball 102 and is positioned such that its mid-section is on a plane with the bottom edge of the modified ball 102, this contributes to a more realistic kicking or striking movement and sensation since the pivot point is at or near the ground level.

To enhance the kicking movement and sensation the motion transfer member 106 is at least partially recessed into the modified ball 102. For example, the motion transfer member 106 can be recessed into the modified ball 102 such that 100% to 31%, such as 77% to 40%, or 45% to 60% of the motion transfer member 106 is recessed within the modified ball 102. In a particular embodiment, the motion transfer member 106 is 50% recessed within the modified ball, with the mid-section of the spring being on a level plan with an exterior surface of the modified ball 102. The ball training device 100 further comprises a housing 108 for the motion transfer member 106. The housing 108 is coupled to the modified ball 102 and is recessed into the bottom of the modified ball 102. In an embodiment, the housing 108 is adhered to an inner portion (not depicted) of the modified ball 102. In another embodiment, the housing 108 mechanically fastens together with an interlocking mechanical engagement (e.g., male-female complementary threading, snap fitting, press fitting, molding, latching fasteners). In another embodiment, the housing 108 comprises two pieces (not depicted) that are coupled to the modified ball 102 via screws. The screws may extend through a first piece of the housing 108 located in an outer portion of the modified ball 102, then extend through the modified ball 102 and into a second piece of the housing 108 located in an inner portion of the modified ball 102. The screws compress the first piece of the housing 108 and the second piece of the housing 108 against the modified ball 102. Alternatively, nuts and bolts can be used instead of screws.

The ball training device 100 further comprises a base coupling device 110 and a housing coupling device 112. An upper portion 126 of the base coupling device 110 at least partially extends into the bottom portion 122 of the motion transfer member 106 and a bottom portion 128 of the base coupling device 110 at least partially extends into the base 104. In an embodiment, the base coupling device 110 is a rod that has a diameter that is slightly larger than the diameter of an opening in the bottom portion 122 of the motion transfer member 106, and the base coupling device 110 is pressed into the bottom portion 122 of the motion transfer member 106. The base coupling device 110 can also be screwed into the motion transfer member 106 and secured by matching inclined screw threads, a pin, or some other coupling mechanism.

In an embodiment, the base coupling device 110 is coupled to the base 104. The base coupling device 110, may either be a part of the base 104 (e.g., the coupling device 110 is molded into the base 104) or be connected directly to the base 104 through a coupling mechanism. In an embodiment, the base coupling device 110 is inserted into the base 104 and is held in place by a pin that is inserted laterally through the base coupling device 110 such that the base coupling device 110 is secured to the base 104. In another embodiment, the base coupling device 110 is a male thread of a screw which is then threaded through complementing female threads located at the bottom portion 122 of the motion transfer member 106 and in the base 104.

In an embodiment, the housing coupling device 112 couples the housing 108 to the motion transfer member 106. In an embodiment, the housing coupling device 112 extends through the housing 108 and partially extends into the motion transfer member 106. In an embodiment, the housing coupling device 112 is threaded, extends upwards through the housing 108, and is coupled to the housing 108 with a corresponding threaded nut (not depicted) screwed onto the threads of the housing coupling device 112. In another embodiment, the housing coupling device 112 extends into the motion transfer member 106 (e.g., a double-conical spring) and is welded or chemically adhered to the motion transfer member 106.

The ball training device 100 further comprises the vertical shaft 114 and the ball coupling device 116. The vertical shaft 114 extends totally or partially through an upper portion 130 of the modified ball 102, down to an upper portion 132 of the housing coupling device 112. An upper end 134 of the vertical shaft 114 is coupled to the modified ball 102 and the bottom end 124 of the vertical shaft 114 is coupled to the motion transfer member 106. The vertical shaft 114 adds structural support to the modified ball 102. The ball coupling device 116 couples the vertical shaft 114 to the modified ball 102. In an embodiment, the vertical shaft 114 is 3 to 8 inches, such as 4 to 7 inches long, threaded, and feeds 3 inches into a 4 inch long at least partially threaded nut or other coupling device (not depicted). The housing coupling device 112 feeds 0.25 to 1 inches, such as 0.5 to 0.75 inches into the threaded nut. In a further embodiment, the ball coupling device 116 is a cap that follows the contour of the exterior surface, and that sits on top of the modified ball 102. The cap 116 has a portion (not depicted) in the center that extends downward into the modified ball 102 such that the vertical shaft 114 can be coupled to the portion in the center of the cap 116.

In an embodiment, one or more of the base coupling device 110, housing coupling device 112, or the ball coupling device 116 can be eliminated by molding or otherwise making integral with one or more of the parts they are coupling. For example, the housing coupling device 112 could be made integral with the vertical shaft 114.

Alternatively, or in addition to the vertical shaft 114, radial fins (not depicted) that extend from the top upper portion 130 of the modified ball 102 towards a lower portion 134 of the modified ball 102 can be used to add structural support to the modified ball 102.

Figure 2:
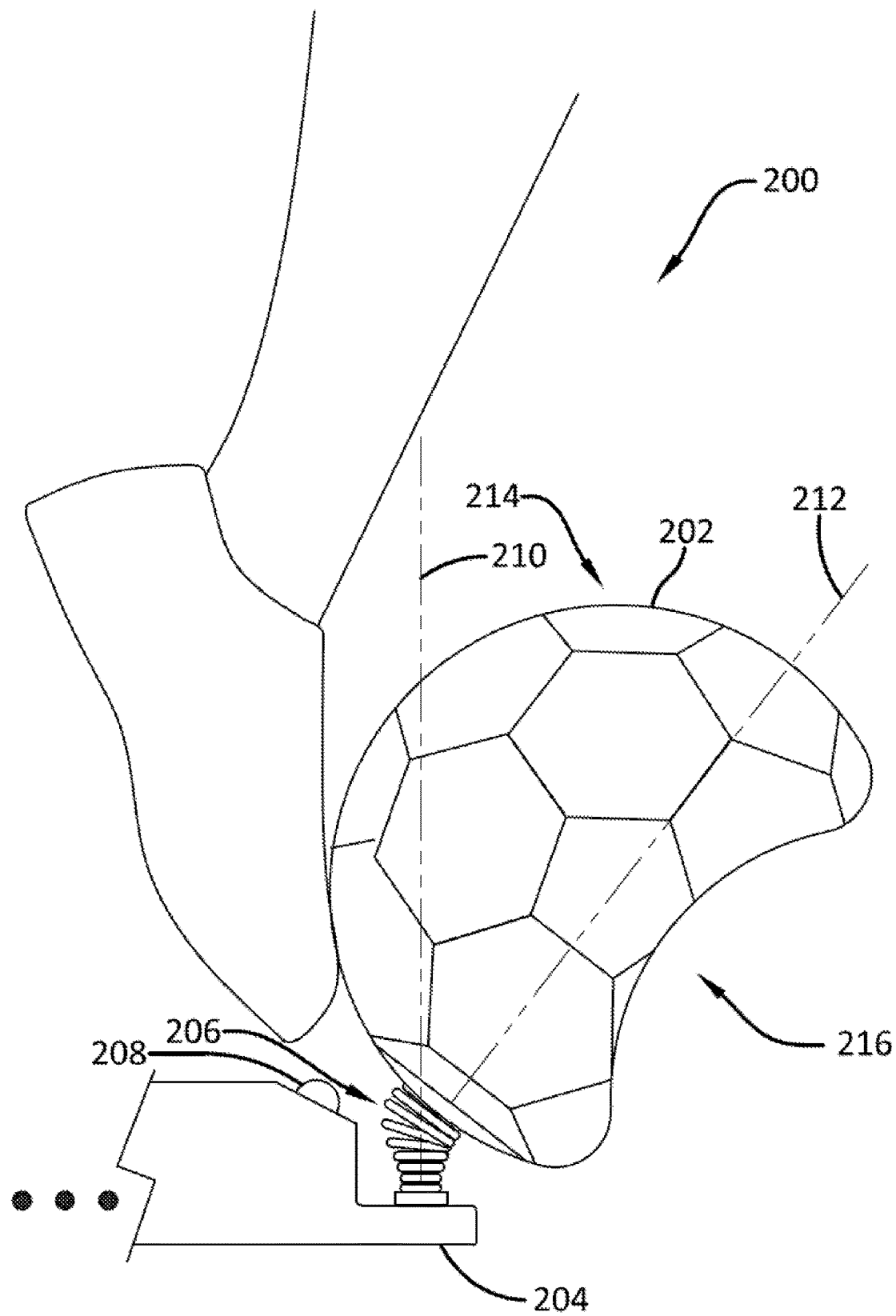
FIG. 2 depicts a lateral view looking slightly upward of an exemplary ball training device after a force is applied.

With reference now to FIG. 2, a lateral view of an exemplary ball training device 200 as a force is applied is depicted. The ball training device 200 comprises a modified ball 202 (in this case a modified soccer ball), a base 204, a double conical spring 206, and a convex positioning device 208. The convex positioning device 208, as further described below, matches a concave positioning device that functions to guide the modified ball 202 back into an initial position after the force is removed. In an embodiment, the convex positioning device 208 is any protruding geometrical shape that is conducive to guiding the modified ball 202 back into place in the concave positioning device. Typically, the geometries of the concave and convex positioning devices 208 will be similar and have complementary curvature, including, for example, the round-shaped protrusion shown in FIG. 2, with a complementary round receptacle, a V-shaped groove concave positioning device with a complementary narrow V convex positioning device 208, or even a square-shaped protrusion with a complementary square-shaped receptacle.

When the modified ball 202 is in an initial position (as shown in FIG. 1), the modified ball 202 is aligned vertically, centered about a first axis 210. When a force (e.g., a kick) is applied to the modified ball 202 such that the modified ball 202 is set in motion, the double conical spring 206 tilts and flexes such that the modified ball 202 is centered about a second axis 212 which is different than the first axis 210, wherein the second axis 212 is dependent on an angle and force of the kick or strike. Most notably, the modified form of the modified ball 202 allows the modified ball 202 to go further down toward the ground or base 204, thereby allowing the user to follow through with the kick or strike with minimal (if any) additional resistance than an actual un-fixed ball.

The base 204 is set on the ground and can further be affixed to the ground. The base 204 is large enough to provide a stationary platform from which a user can position themselves to stand on and kick the modified ball 202. For example, the base 204 can be 2 ft to 6 ft wide and 2 ft to 8 ft long, or fall within a range of 4 to 36 square ft, such as 6 to 27 square ft or 10 to 20 square ft. The modified ball 202 is coupled to or near an edge of the base 204 such that a user can stand on the base 204 and deliver a kick to the modified ball 202 without the user having to leave the base 204. It is also envisioned that the modified ball 202 can be coupled to a lateral protrusion of the base 204. The modified ball 202 is centered above the lateral protrusion and is coupled to the base 204 via the base coupling device 110. The modified ball 202 may be centered above and 0.25 to 10 inches laterally from edge of the base 204, such as 1 to 5 inches, or 2 to 3.5 inches.

The double conical spring 206 has a free length parameter and a solid height parameter. A free length of a spring is a length of the spring when there is no load applied to the spring. A solid height of a spring is a length of the spring when the spring is fully compressed such that there is no more gaps between coils of the spring. The double conical spring 206 has a free length and a solid height that are equal or within ±30% equal to one another such as ±30%, ±20%, or ±10%. The solid height of the double conical spring 206 may be 1.5 to 8 inches, 2 to 6 inches, or 0.25 to 4 inches.

The double conical spring 206 comprises a wire which is coiled into a wire coil. The wire has a diameter of 0.05 to 0.25 inches, such as 0.1 to 0.2 inches, or 0.7 to 0.17 inches. The wire coil has a small outer diameter and a small inner diameter that are near the terminal ends of the double conical spring 206. In an embodiment, the small outer diameter is 0.5 to 1.5 inches, such as 0.6 to 1 inches, or 0.55 to 1.34 inches. In an embodiment, the small inner diameter is 0.1 to 0.7 inches, such as, 0.4 to 0.55 inches, or 0.25 to 0.65 inches. The wire coil further comprises a large outer diameter at its widest part near a center of the double conical spring 206. In an embodiment, the widest part is at the center, in an embodiment, it is offset toward the bottom surface, such as at 10% to 45% the total height of the spring or 20% to 35% the total height of the spring. In an embodiment, the large outer diameter is 1 to 3 inches, 1.5 to 2 inches, or 1.2 to 1.7 inches. In an embodiment, the double conical spring 206 has a solid height of 1 to 6 inches, such as 1.5 to 5 inches, or 2.7 to 3.8 inches. In an embodiment, the double conical spring 206 has a solid height of 3.36 inches, a wire diameter of 0.15 inches, a small outer diameter of 0.8 inches, a small inner diameter of 0.5 inches, and a large outer diameter of 1.5 inches.

In use, the convex positioning device 208 promotes the modified ball 202 to quickly return to its initial position centered about the first axis 210. A user kicks (i.e., applies a force to) the modified ball 202 such that the modified ball 202 is set in motion. As a result of the kick, the double conical spring 206, which is coupled to the modified ball 202, stretches (as explained above) near the base 204 of the modified ball 202. The double conical spring 206 resists the compressing and/or stretching and exerts a force to bring the modified ball 202 back to rest, centered about the first axis 210. When the modified soccer ball recoils back towards the first axis 210 after the kick, the convex positioning device 208 is configured to restrict some oscillations that come about from the spring such that the modified ball 202 settles about the first axis 210 more quickly than if the convex positioning device 208 were not present. The convex positioning device 208 is discussed in more detail below.

In a further example, the exemplary ball training device 200 is configured with electronics, such as a sensor and a network communication interface. The sensor may, for example, be a motion sensor, an impact sensor, a gyroscopic sensor, an orientation sensor, a chip feedback device, an accelerometer, an infrared sensor, a magnetometer, an optical sensor, other positions sensors, or a combination of any of these. Configured as such, the exemplary ball training device 200 detects and communicates motion or impact data to or with a computing device.

In an example, the computing device can be a computer processor configured to run a virtual simulation (e.g., virtual reality simulation or augmented reality simulation) that is displayed onto a visual display (e.g., a digital screen, a projection onto an object, or a virtual reality headset). The sensor then, via network communication, conveys the motion or impact force as input to the computing processor such that the force applied to the modified ball is simulated in the virtual simulation. In a more specific example, a kick applied to the modified ball 202 can be used as input to simulate a kick applied to a simulated ball.

In an embodiment, the ball may have impact sensors that work in conjunction with a removable wearable input device, such as for the foot or ankle. For example, there may be multiple impact sensors on a sock, in locations corresponding to the top of the foot, either side of the foot, or other areas of the foot. The ball may have impact sensors on the front center, the sides, the bottom or top. Instead of impact sensors another type of sensor could be used, such as one based on proximity detection. In an embodiment, the sensors stream the data to a processor which interprets the foot placement (which sensor on the sock was triggered) and the area of the ball impacted, along with the magnitude of the force and processes the data with virtual environment characteristic, to provide a display that mimics the action on a display. An ankle wearable input device could provide less direct input, but the same data could be inferred to produce a depiction of the kick and resulting ball travel on the display. The wearable could use a Gyroscopic-Accelerometer-Magnetometer type sensor to provide position and motion input.

It is further envisioned that the electronics may be coupled to the exemplary ball training device 200, or the electronics may be located external to the exemplary ball training device 200. The sensor may be mounted on or in the modified ball 202 itself, such as, on a front (kicking or striking) side 214 of the modified ball 202, so that it senses the impact of the kick or strike; on a back side 216 of the modified ball 202 so that it senses when the back side 216 hits the base 204 or the ground; as sensory skin on an exterior surface of the modified ball 202, e.g., to detect an impact delivered anywhere on the surface of the modified ball; on a bottom side of the modified ball 202 or the positioning device 208, e.g., to detect when the modified ball 202 leaves or returns to the first axis 210; or inside the modified ball 202, in various configurations.

In yet another embodiment, optical sensors external to the modified ball 202 and external to the base 204 can convert motions associated with the modified ball 202 and motions associated with a user into input data for a computing device. In a further embodiment, sensors are placed externally, e.g., to detect the impact of the back side 216 of the modified ball 202 on the base 204 or a mat placed under and where the back side 216 of the modified ball 202 would hit the ground when kicked or struck. In another further embodiment, sensors are placed externally of the exemplary ball training device 200, the sensors convert motions associated with a user to motions associated with a simulation of the user. The sensors further sense motions and forces applied to the modified ball 202 and convert said motions and forces into simulated motions, forces, and trajectories applied to a simulated ball. A computing device can then cause the simulations to be depicted onto a display (e.g., a digital screen, a projection onto an object, or a virtual reality headset) and can additionally or independently provide analysis of the sensed motions and forces. This analysis can be used to inform the user what aspects of their form needs to be worked on.

In an embodiment, the base 204 is a 3 ft wide by 5 ft long base which comprises pressure sensors distributed within the base 204, such that a user standing on the base 204 can actuate a pressure sensor. The base 204 is configured to be placed on a floor or the ground, both of which should be substantially flat. In an embodiment the base 204 includes a standing surface, where a user can stand to kick the modified ball 202, using their own weight on the base 204 to anchor the base 204 in place. The base 204 can be broken into multiple pieces for storage and connected via a mechanism, such as one or more tongue-in-groove features, or e.g., a hinge, such as a plano hinge device. In an embodiment, the base 204 is substantially flat. In an embodiment, the base 204 is covered with an artificial turf surface. The base 204 should be relatively low in height, so as to prevent injuries from partially stepping off or falling off the base 204. The base 204, may have a height of 0.25 inches to 3 inches, such as 0.5 to 2.75 or 1 to 2 inches. By height it is meant the maximum height, which may be slightly higher than the bottom of the modified ball 202 at rest (e.g., 0.1 to 1 inch, 0.2 to 0.8 inches, or 0.3 to 0.6 inches). In an embodiment, the bottom of the modified ball 202 at rest is configured to be 0.1 to 1 inch, 0.2 to 0.8 inches, or 0.3 to 0.6 inches) off the ground or surface.

In another embodiment, the exemplary ball training device 200 may be coupled to a treadmill. The treadmill can be a unidirectional treadmill or a multidirectional treadmill. When coupled to the treadmill, a user can introduce a running aspect to the exemplary ball training device 200 whilst still maintaining a compact profile. In an embodiment, a user can run on a multidirectional treadmill and perform kicks to the exemplary ball training device 200 to play in a virtual or augmented reality soccer game.

Figure 3:
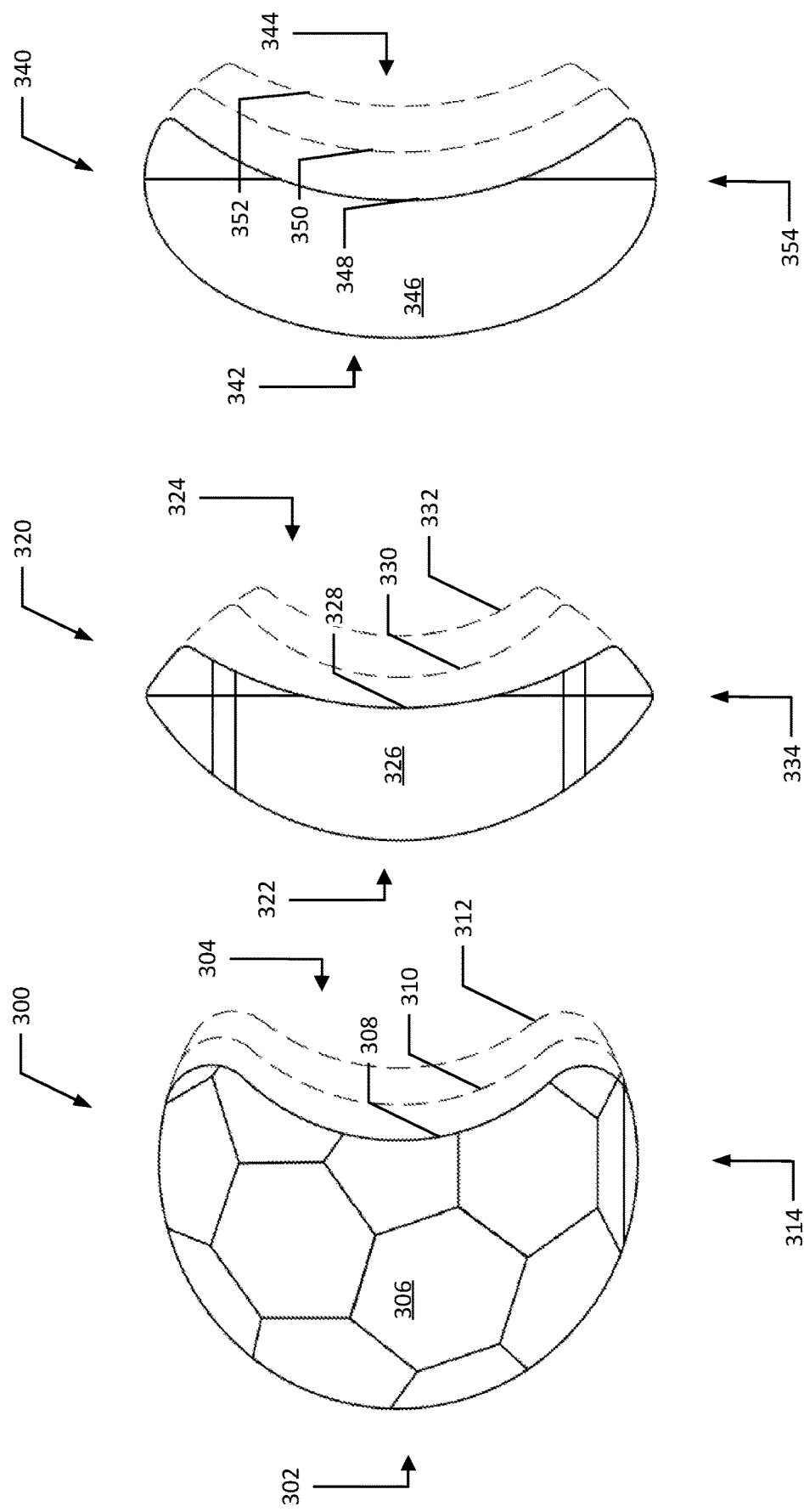
FIG. 3 illustrates lateral views of multiple exemplary shape modifications to different types of sports balls.

With reference now to FIG. 3, lateral views of multiple exemplary shape modifications to different types of sports balls are illustrated. A modified soccer ball 300 is depicted. The modified soccer ball 300 has a decreased exterior surface area compared to a conventional ball of the same maximum radius. The modified soccer ball 300 has a front half 302 and a back half 304. The front half 302 is configured to receive the kicking impact (i.e., facing the user and including or facing the positioning device 208). The back half 304 is configured to impact or come closest to impacting the base 204 or ground. The modified soccer ball 300 has a spherical segment on the front half 302 that is the kicking surface 306. A portion of the back half 304 may also include a kicking surface, but a portion of the back half 304 of the modified soccer ball 300 is non-spherical and is a truncated sphere, whereas the front half is not truncated.

In other embodiments of the modified ball, other geometries will have a front half 302 that is essentially the shape of a conventional ball, e.g., football or rugby ball, prolate spheroids, and the back half 304 is a truncated or otherwise reduced volume version of the same ball. In an embodiment, the back half 304 has an at least partially hollow configuration. In an embodiment, the modified ball 300 has less exterior surface area of a conventional ball of the same maximum radius. In any case, the modified ball is configured to bend further towards the ground or base before hitting the ground or base compared to a conventional ball. The back half 304 has a maximum radius less than that of the front half 302.

In an embodiment, for example, a regulation size 5 soccer ball with an 11 cm radius, or 22 cm diameter has a total surface area of approximately 1521 cm², and a half surface area of approximately 761 cm². The total surface for a regulation size 5 soccer ball corresponds to its total kicking surface area. A modified soccer ball 300 with the same maximum radius as a size 5 soccer ball will have a kicking surface area that is anywhere between 761 cm² and 1521 cm², such as, for example, 800 to 1300 cm², or 900 to 1200 cm². The kicking surface area of the front half 302 is greater than the kicking surface area of the back half 304. The modified soccer ball 300, or more generally, any modified ball, may have a kicking surface area that is 99% to 50% of a conventional ball of the same maximum radius, such as 90% to 55%, 80% to 60%, or 75% to 65%. The modified soccer ball 300, or more generally, any modified ball, may have a total radial thickness of 55 to 98% of a matching (same maximum radius) spherical or otherwise conventionally shaped ball, such as 95% to 60%, 85% to 65%, or 80% to 70%. The front half 302 of the modified soccer ball 300, or more generally, any modified ball has a front half 302 that is 100% of a matching spherical or otherwise conventionally shaped ball, and the back half 304 has the entirety of the reduced radial thickness disclosed above. In an embodiment, the modified soccer ball 300, or more generally, any modified ball, may have a kicking surface area that is 99% to 33% of a conventional ball of the same maximum radius, such as 60% to 45%, 55% to 48%.

Some exemplary modified soccer ball 300 shapes are depicted in the forms of first, second, and third shapes 308, 310, and 312. Further, a modified American football 320 is also depicted, with first, second and third shapes 328, 330, 332. The modified American football 320 can be a shape from a range of shapes such that the exterior surface area of the modified American football 320 is greater than the exterior surface area of half an American football and less than the exterior surface area of a full American football. The modified American football 320 has a front side 322, a back side 324, and a kicking surface 326. Similarly, a modified rugby ball 340 is also depicted with first, second, and third shapes 348, 350, and 352. The modified rugby ball 340 can be a shape from a range of shapes such that the exterior surface area of the modified rugby ball 340 is greater than the exterior surface area of half a rugby ball and less than the exterior surface area of a full rugby ball. The modified rugby ball 340 has a front side 342, a back side 344, and a kicking surface 346.

The modifications of the modified soccer ball 300, the modified American football 320, and the modified rugby ball 340 are an improvement over conventional ball training devices as a modification made to the shape of the modified balls simultaneously allows for a larger range of motion when applying a force to a modified ball while also allowing the lowering of the modified ball to a more "natural" ball position (i.e., closer to a ground level). While practically there is often a need to have some material on a back surface (e.g., the back halves 304, 324, 344) for anchoring it to a remainder of a ball training device, the less material at a bottom (e.g., a bottom portion 314, 334, 354) of the back surface (e.g., the back halves 304, 324, 344) the lower a modified ball (e.g., one of the modified balls 300, 320, 340) can pivot towards the ground. In an embodiment, the bottom portion 314, 334, 354 has a smaller radius than the upper half of a modified ball. It is noted that the modified balls 300, 320, 340 may have exposed hollow interiors, hollow interiors that are not exposed (i.e., covered with a material on a modified side of a modified ball), or no hollow interiors.

It is further envisioned that a bottom portion 314 of the modified soccer ball 300, a bottom portion 334 of the modified American football 320, and a bottom portion 354 of the modified rugby ball 340 can be partially flattened. A partially flattened bottom portion can allow for an even lower ball position. In an example, when practicing kicking of an American football, it is known that a "sweet spot" to which a kicker should aim for is located 1.5 to 4 inches, e.g., 1.8 to 3.8 inches or 2 to 3.5 inches from a bottom tip of a conventional American football. As such, the modified American football 320 may truncate 0.5 to 3 inches from the bottom of the normal ball shape, such as 0.75 to 2 inches, or 1 to 1.75 inches above where a bottom tip of a conventional American football is normally located, since providing a kick to the bottom tip of an American football is undesirable and would cause it to "pop" up into the air (if not coupled to the base). This bottom truncation can be done for other balls as well, such as a golf ball, or others disclosed herein. The balls disclosed herein can be both truncated at the bottom (to reduce the height of the ball and adjust the kicking surface and center of gravity) and truncated at the back (to allow the ball to drop down far enough for a follow through kick.

In an embodiment, the bottom and top chin areas of the modified balls, i.e., the bulging portions at the top and bottom, can be shaved back even more than what is depicted to improve foot follow through and bounce-back dynamics. For example, the bulging portion can be removed and cut straight. In most cases, the less material on the back, the better for ball dynamics; however, sufficient material should remain to hold the motion transfer member in place at the natural axis of a normal ball. In an embodiment, all the ball material is removed from the right side of the modified ball, but a supporting structure is added that extends into this area to support the coupling of the motion transfer member to the modified ball.

Figure 4:
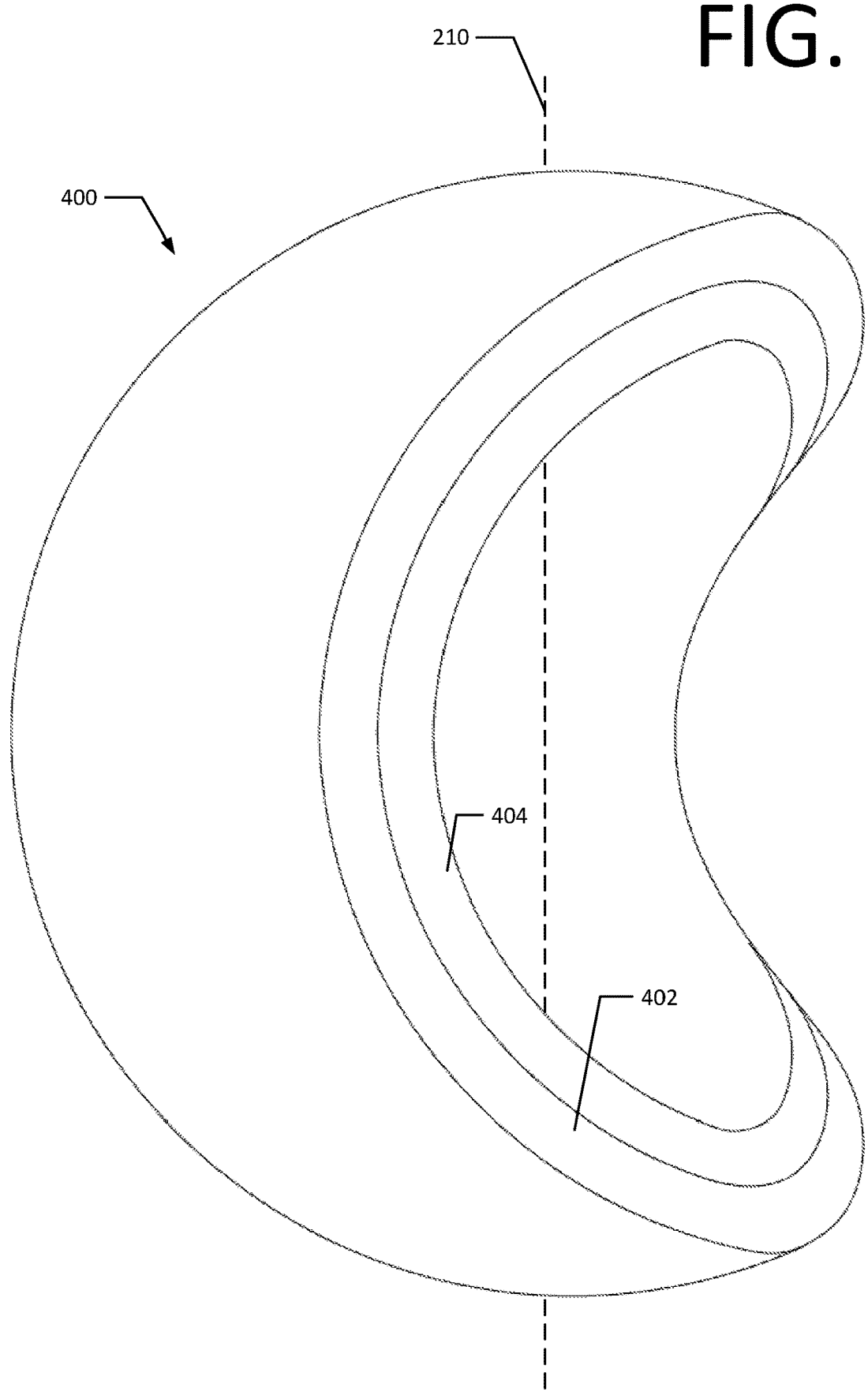
FIG. 4 depicts a partial cross-sectional view of layers of an exemplary modified ball.

With reference now to FIG. 4, a cross sectional view revealing layers of a modified ball 400 is depicted. The modified ball 400 comprises an outer layer 402 and an inner layer 404. The inner layer 404 is stronger than the outer layer 402, wherein strength herein is determined by the ASTM 3574-D. The outer layer 402, for example, may be leather or a simulation leather material, while the inner layer 404 is a polyurethane or other cellular foam. In an embodiment, the inner layer 404 and outer layer 402 materials are selected and configured with the vertical shaft 114 such that the ball is not pneumatically inflated but approximates the feel of a pneumatically inflated ball.

The modified ball 400 may comprise at least one of a plurality of materials such as composite plastics, silicone rubber, polyurethane, NERF foam-type cellular materials, a POPFOAM material, neoprene, open cell foam, closed cell foam, crosslinked foam, non-crosslinked foam. NERF materials are a reaction product of polyester resin with another compound in the presence of $CO_2$. POPFOAM materials are an ethyl vinyl acetate (EVA) blend compounded with microcellular agents.

It is further envisioned that there may be more layers than the outer layer 402 and the inner layer 404. In an example, there may be a second inner layer that is nearer a center of the modified ball 400 than the inner layer 404 and a third inner layer that is nearer the center of the modified ball 400 than the second inner layer.

In an embodiment, a hollow portion within the modified ball 400 may be filled with a material, consequently, ridding the modified ball 400 of the hollow portion. It is also envisioned that electronics may be housed within a hollow of the modified ball 400. In an embodiment, foam may be used to fill in the hollow portion to protect the electronics.

It is to be noted that a modified ball 400 may comprise only a single layer. When at least two layers are present, such as an outer soft skin and an inner rigid structural shell, an inner layer 404 may provide structural integrity for a ball, while an outer layer 402 can allow for a surface with a softer surface and/or a surface with a high resistance to scratching and marring. Both are desirable, when kicking a ball, so as to prevent a serious foot injury due to striking a hard surface and to promote durability of the modified ball 400. It is also envisioned that there may be a continuum of "layers." For example, the continuum of layers may comprise a continuum of strengths such that the outer most layer of the continuum of layers is less strong than the innermost layer of the continuum of layers.

Figure 5:
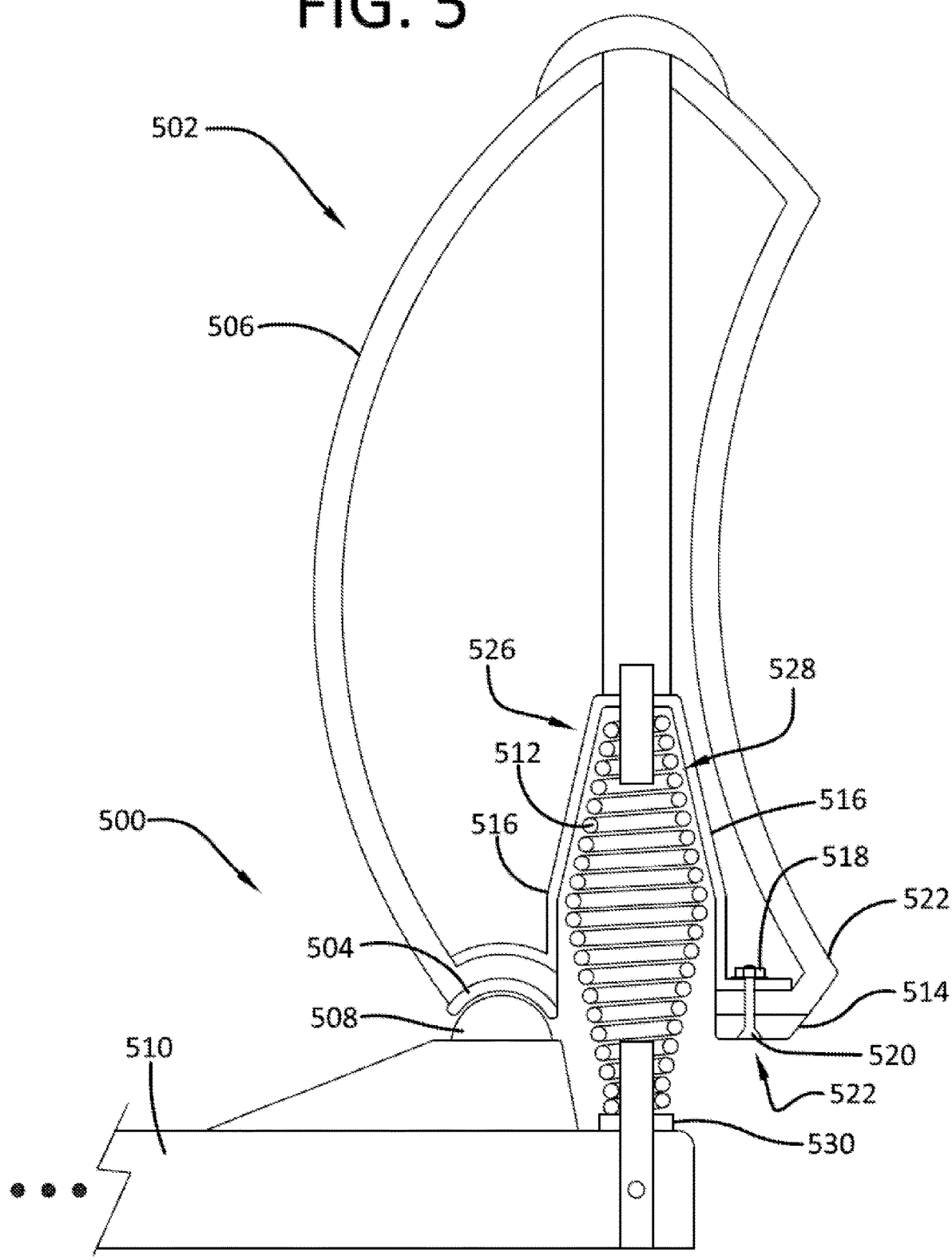
FIG. 5 is a cross-sectional diagram of an exemplary positioning device applied to an exemplary ball training device.

With reference now to FIG. 5, an exemplary positioning device 500 applied to a sports ball training device 502 is illustrated. The positioning device comprises a first component 504 that is coupled to a modified ball 506 and a second component 508 that is coupled to a base 510 via a ramp 509. The ramp 509 prevents the user from kicking underneath the modified ball 506. In an embodiment, the bottom of the modified ball 506 will rest slightly below (e.g., 0.1 to 3 inches, such as 0.3 to 2 inch, or 0.5 to 1 inches) and back from the top of the ramp 509, in such case, the second component can be set down further to accommodate the deeper setting of the modified ball 506. The first component 504 and second component 508 are configured to be in a nested configuration when the modified ball 506 is in the initial (upright, un-kicked) position. In an embodiment, the first component 504 is a convex protrusion whose general shape nests within the second component 508, wherein the second component 508 is a concave cavity.

In another embodiment, the first component 504 is a concave cavity and the second component 508 is a convex protrusion. Similar to the previous embodiment, the general shape of the first and second components 504, 508 allows for the second component 508 to nest within the first component 504. It is also envisioned that the first component 504 may instead be integrated into a shape of the modified ball 506 instead of being coupled to the modified ball 506. It is also envisioned that the second component 508 may be integrated into a shape of the base 510 instead of being coupled to the base 510.

In another embodiment, the first component 504 is a magnetic material and the second component 508 is an electromagnet configured to interface with the first component 504. In yet another embodiment, the first component 504 is an electromagnet and the second component 508 is a magnetic material which is configured to interface with the electromagnet. The first and second components 504, 508, may also be permanent magnets aligned for attraction.

The sports ball training device 502 also comprises a double conical spring 512 and a housing for the double conical spring 512. The housing comprises a first piece 514 of the housing and a second piece 516 of the housing that are coupled to the modified ball 506 via a nut 518 and bolt 520; though not depicted in FIG. 5, there can be multiple nuts and bolts coupling the first piece 514 of the housing to the second piece 516 of the housing. As depicted the first component 504 of the exemplary positioning device 500 is molded into the first piece 514 of the housing. The bolt 520 extends through the first piece 514 of the housing located in an outer portion of the modified ball 506, then extend through a layer 522 of the modified ball 506 and into the second piece 516 of the housing located in an inner portion 524 of the modified ball 506. The nut 518 and bolt 520 compress the first piece 514 of the housing and the second piece 516 of the housing against the modified ball 506, securing the housing in place. Alternatively, screws can be used instead of nuts and bolts. A top half portion 526 of the first piece 514 tapers around a top half portion 528 of the double conical spring 512. The sports ball training device 502 further comprises a washer 530 between the base 510 and the double conical spring 512. The washer 530 provides for consistent spacing between the double conical spring 512 and the base 510 as well as extra durability for when the double conical spring 512 is pressed up against the base 510, either during an impact, such as a kick, or during manufacturing when the double conical spring 512 is coupled to the base 510.

Figure 6:
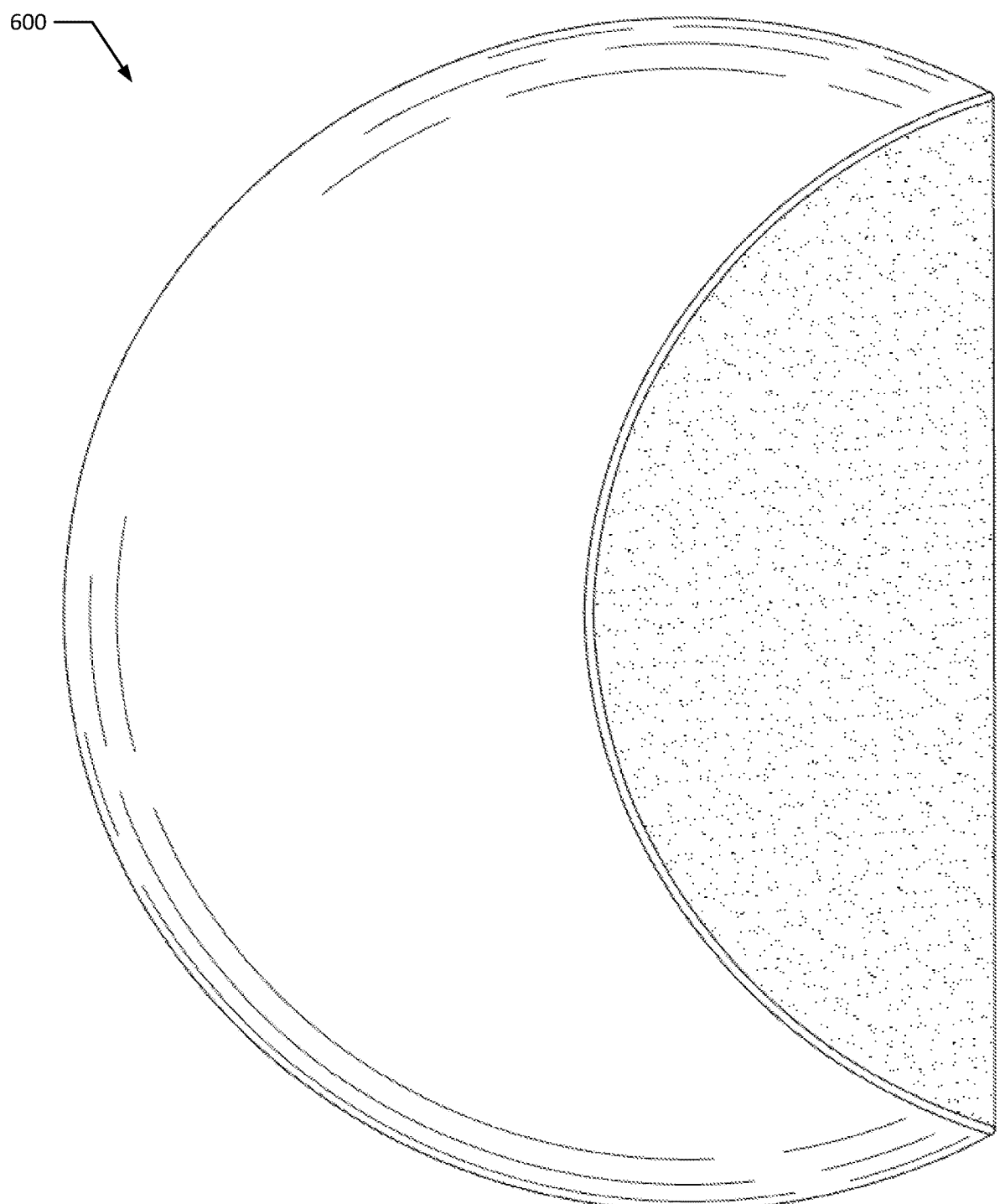
FIG. 6 is a lateral view of an exemplary modified ball.

With reference now to FIG. 6, an exemplary modified ball 600 is depicted. A first portion 602 of the modified ball 600 resembles a shape of a conventional soccer ball, while a second portion 604 of the modified ball 600 depicts a face of a "truncated" sphere.

Figure 7:
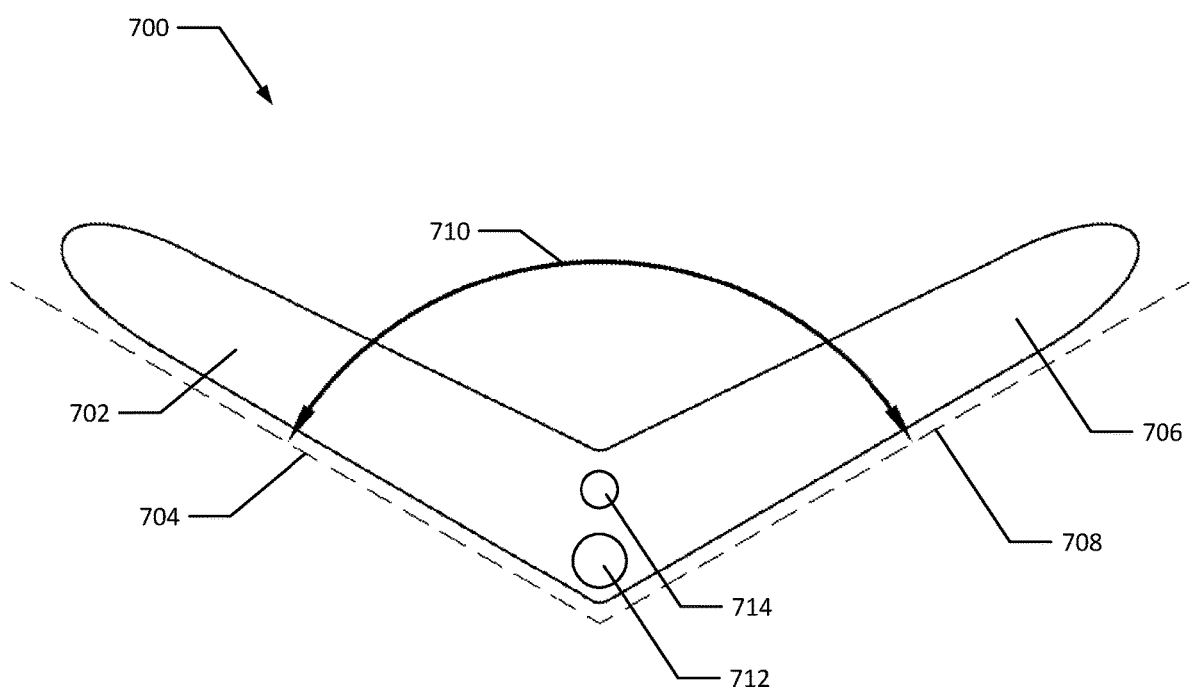
FIG. 7 is a top-down view an exemplary base for a ball training device.

With reference now to FIG. 7, an exemplary base 700 for a ball training device is illustrated. The exemplary base 700 comprises a first lateral projection 702 aligned with a first axis 704 and a second lateral projection 706 aligned with a second axis 708, wherein there is an angle 710 between the first axis 704 and the second axis 708. The angle 710 is greater than 30 degrees and less than 180 degrees. For example, the angle 710 may be in the range of 45 to 160 degrees, 60 to 135 degrees, or 90 to 125 degrees. In an embodiment, the first and second lateral projections 702, 706 may include an elastomeric material as a bottom layer, or an elastomeric material as an end portion with a flat bottom to provide better grip to prevent movement of the base 700.

At an intersection of the first lateral projection 702 and the second lateral projection 706 is an anchoring device 712. In an embodiment, the exemplary base 700 is made more stable by being weighted and the anchoring device may be optional. In another embodiment, the exemplary base 700 is made more stable by being anchored to the ground. In a more specific embodiment, the anchoring device 712 is a stake driven through the exemplary base 700 into the ground. In an example, the exemplary base 700 is placed onto a grass lawn (i.e., the ground), and a stake is driven through the base into the ground. A modified soccer ball is also coupled to the base 700 via a central connection point 714 at the intersection. A user can kick the modified soccer ball and train different kicks with the modified soccer ball.

Figure 8A:
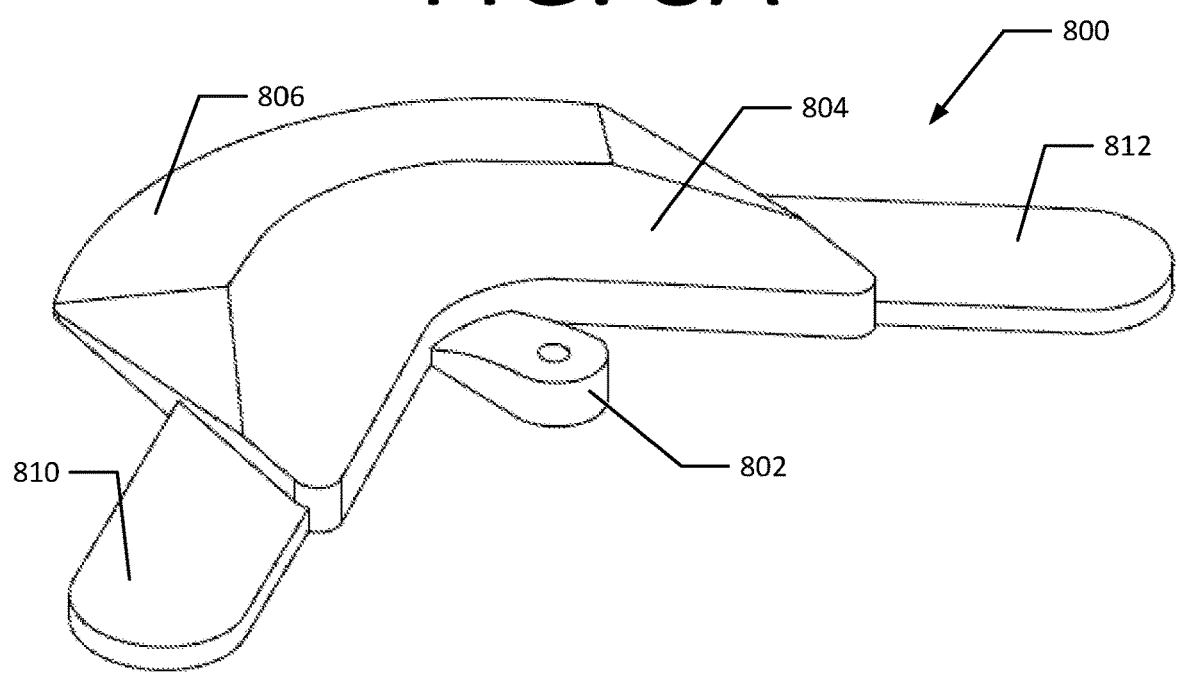
FIGS. 8A and 8B depict perspective views of an exemplary base for a ball training device.
Figure 8B:
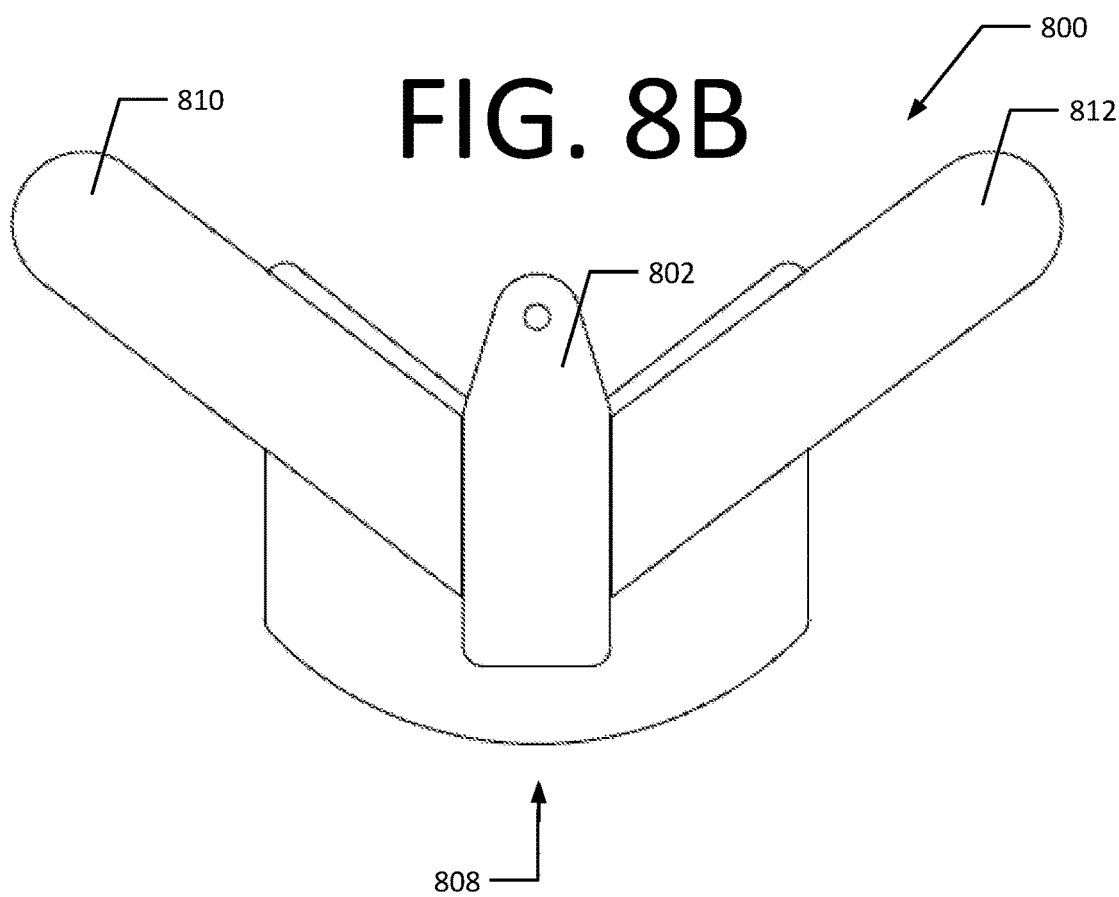

With reference now to FIG. 8A and FIG. 8B, FIG. 8A is a perspective view of an exemplary base 800. FIG. 8B is a bottom-up view of the exemplary base 800. The exemplary base 800 is similar to the exemplary base 700 yet further comprises a central protrusion 802 for mounting a modified ball (not depicted) and a semicircular portion 804 comprising a beveled edge 806 on a front side 808 of the exemplary base 800. The exemplary base 800 is weighted and may also include a high friction surface on the bottom (e.g., an elastomer with high coefficient of friction or tackiness). The weight of the base may be 5 lbs. to 30 lbs., such as 12 lbs. to 20 lbs., or 15 lbs. to 18 lbs.

The exemplary base 800 comprises a first lateral protrusion 810 and a second lateral protrusion 812. The exemplary base 800 can be used with or without the first and second lateral protrusions 810, 812. Having the first and second lateral protrusions 810, 812 allows for more stability when a force coming from the side is applied to a ball attached to the exemplary base 800. Further, having the first and second lateral protrusions adds to the weight of the exemplary base 800, which inherently increases stability. It is envisioned that the first and second lateral protrusions 810, 812 can be modular, or they can be folded, swiveled, telescoped away to allow for a more compact shape of the exemplary base 800. In an embodiment, a middle portion can be added to span between the lateral protrusions and stabilize the device out in front of the modified ball further. In an embodiment, a user can stand on an existing ground/surface instead of on top of a base platform (e.g., the base 104, the base 204, the base 510). The beveled edge 806 allows for a smooth natural transition from the existing ground/surface through the exemplary base 800. These features make the exemplary base 800 more portable and easier to set up than other embodiments, such as, for example, the base 204 of FIG. 2. It is also envisioned that just the semicircular portion 804 can be used as a base (i.e., without the first and second lateral protrusions 810 and 812).

Figure 9:
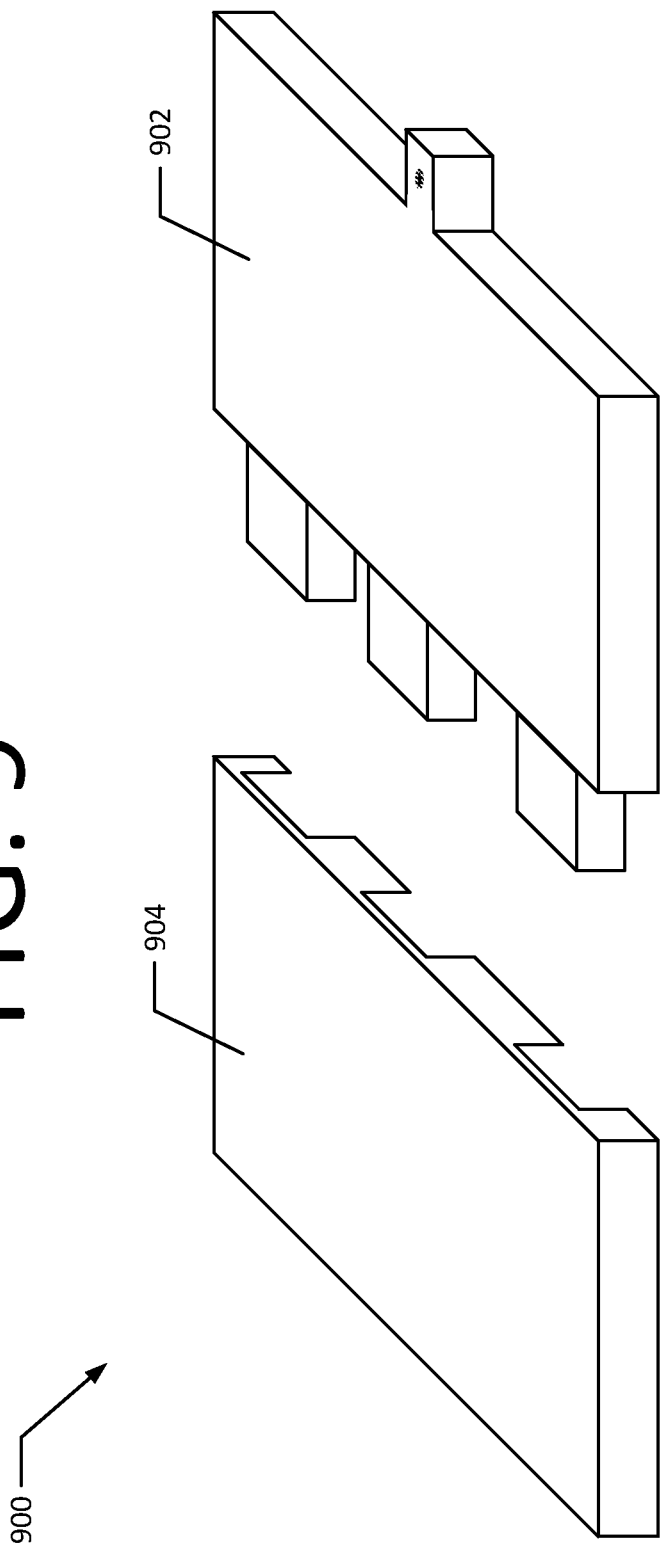
FIG. 9 depicts an exemplary base for a ball training device.

Referring now to FIG. 9, an exemplary base 900 is depicted. The exemplary base 900 comprises multiple pieces that can be coupled together. As depicted, the exemplary base 900 comprises a first piece 902 and a second piece 904 that couple together via tongue and groove joints. In another example, the exemplary base 900 comprises four pieces that couple together via magnets. In yet another example, the exemplary base 900 comprises three or more pieces that are coupled together via a flexible material that allows for the exemplary base 900 to fold or join together in an accordion like manner.

In an embodiment, the base is a rectangular unit, approximately 1 to 3 feet in the longest length, such as 1.5 feet to 2.5 feet, or 1.8 feet to 2.2 feet with a cut-out for a carrying handle. The width can be for example, 6 inches to 18 inches, such as 8 inches to 16 inches or 10 inches to 14 inches. The base may have two layers, a bottom elastomeric layer with high surface friction and an upper metal (or otherwise dense material) layer for adding weight.

Referring now to FIG. 10A, a perspective view of a partial cross section of an exemplary golf training device 1000 is depicted. Alternative to having a sports ball training device that requires kicking, the technology described herein can also be applied to a golf ball that is struck by a golf club. The exemplary golf training device 1000 comprises a modified golf ball 1002, a conical spring 1004, and a base 1006. The modified golf ball 1002 is coupled to the conical spring 1004 and the conical spring 1004 is coupled to the base 1006. The modified golf ball 1002 can be coupled to the base 1006 as the modified ball 102 is coupled to the base 104 from FIG. 1. It is also envisioned that the modified golf ball 1002 can comprise a monolithic interior allowing it to be threaded onto the conical spring 1004, and/or the modified golf ball 1002 can be chemically adhered to the conical spring 1004. A shape of the modified golf ball 1002 is modified in the same manner as the exemplary balls depicted in FIG. 3.

The conical spring 1004 can be recessed into the base 1006, the recessing of the conical spring 1004 can be adjusted by adjusting the thickness of the base 1006 (e.g., adding padding or material atop the base 1006, by coupling a height adjustable device between the conical spring 1004 and the base 1006). In an embodiment, a top surface of the base 1006 is configured for a user to stand on, and a bottom portion of the motion transfer member is coupled to a recessed portion of the base 1006. Further, the base 1006 can be fitted or covered with artificial turf so as to imitate a golfing green. The artificial turf (not depicted) can comprise a padded material on an underside of the artificial turf, which simulates the natural feel and operation of a conventional golfing green.

The base 1006 is thicker on a front facing side 1008 of the modified golf ball 1002. This permits the conical spring 1004 to flex all the way to the ground when a force is applied to the front facing side (i.e., opposite of the modification) of the modified golf ball 1002 while still providing a desirable "teeing" height for the modified golf ball 1002. The conical spring 1004 further provides for a more natural feel when applying a force (e.g., hitting the modified golf ball 1002 with a golf club) to the modified golf ball 1002, since the conical spring 1004 can flex in a telescopic manner, both downward and outward. In addition, it is envisioned that a protective coating (not depicted) can be applied to at least a striking side (i.e., the front facing side) of the conical spring 1004 to alleviate damage that can occur to a club head if the club head were to strike the conical spring 1004.

Figure 14:
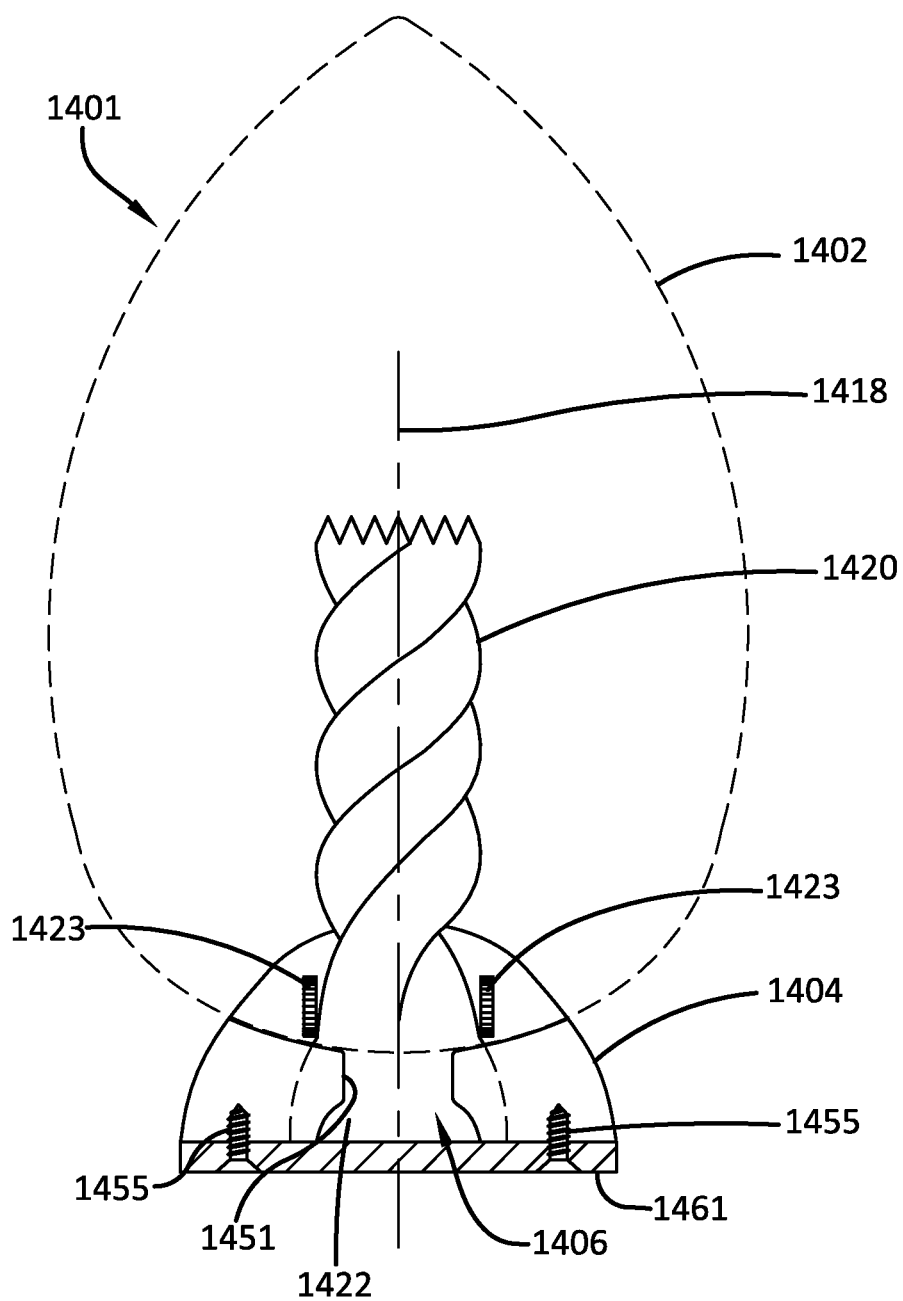
FIG. 14 is a partial cross-sectional diagram of an exemplary ball training device.

In an embodiment, the motion transfer member used with the modified golf ball 1002 can be an elastomeric member (such as the braided or twisted material disclosed in the discussion of the embodiment of FIG. 14) instead of a conical spring 1004. A different housing can be used in this case, as disclosed in FIG. 14 and accompanying text.

With reference now to FIG. 10B, FIG. 10B gives a view of the exemplary golf training device 1000 as seen from a back facing side 1010 of the modified golf ball 1002.

In an embodiment, the modified golf ball 1002 can be raised or lowered based on the gaming conditions. For example, a tee shot would be higher than a shot in the rough or in sand. The user could select different physical clubs for hitting to account for this situation. A simulation could sense or receive input about the change in clubs (e.g, from a button press, or Bluetooth, RFID chip and proximity sensor) and modify the processing of the sensor input to change the ball trajectory accordingly and depict different club on a display. In an embodiment, A change in clubs could also be depicted on the screen. In an embodiment the raising or lowering of the ball can be automatically and without user intervention, such as by a motor-driven mechanism, the computing device of the system would transfer information about the environment in which the ball lands to the device housing the modified golf ball 1002 to accomplish this.

Figure 11:
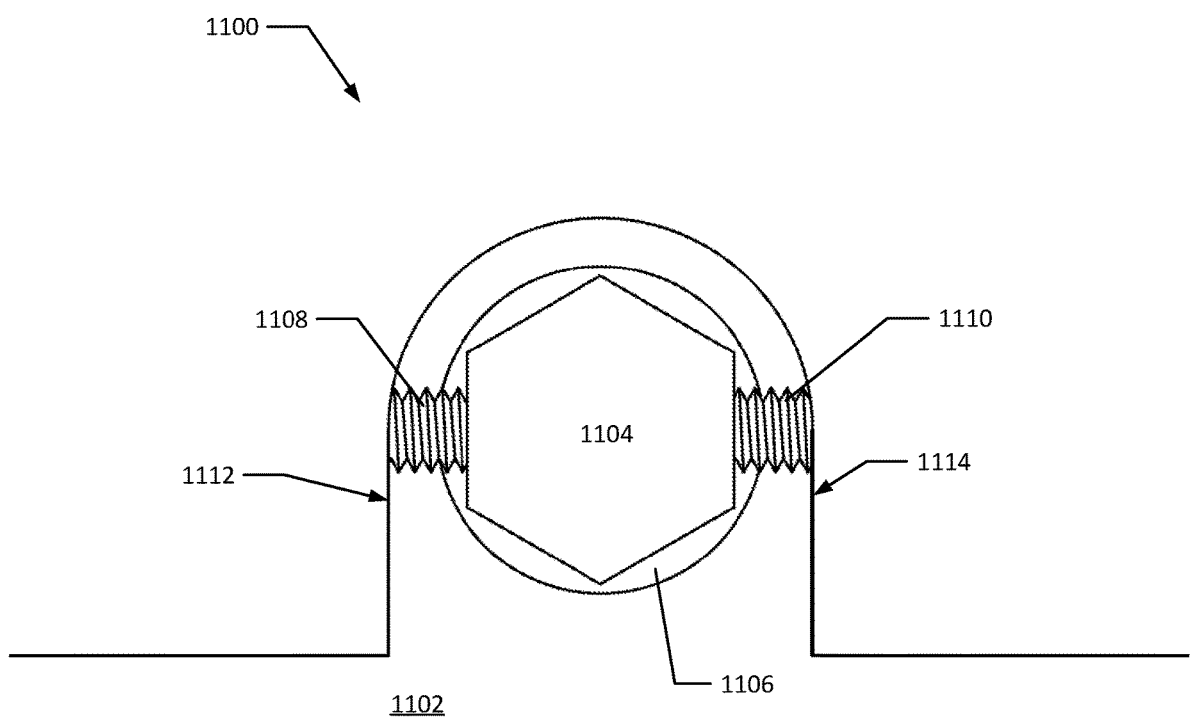
FIG. 11 is a bottom-up, zoomed-in view of an exemplary device for securing and limiting rotation of a coupling device for the modified ball.

With reference now to FIG. 11, a bottom-up view of a device 1100 for limiting rotation of a bolt is depicted. The device 1100 comprises a base 1102, a bolt 1104, a cavity 1106 in which the bolt 1104 sits, a first pin 1108, and a second pin 1110. The first and second pins 1108, 1110 restrict the movement including rotational motion of the bolt 1104.

In an exemplary embodiment, the bolt 1104 is set within the cavity 1106 and affixed into place with a bolt nut (not depicted) on an opposite side of the cavity 1106 until snug. Subsequently, the first and second pins 1108 and 1110 are inserted through the edges 1112 and 1114 of the base 1102 until they touch a side of the bolt 1104 or enter into a hole or threaded hole on a side of the bolt 1104 so as to restrict the bolt 1104 from rotating and becoming loose. It is noted that one of the pins 1108, 1110 may be sufficient. It is further noted, that more than two pins 1108, 1110 may be used. In an example, for a six sided bolt head, six pins may be inserted through the base such that a single pin touches or enters into every side of the bolt head. In an embodiment, the pins may include, but are not limited to ring, roll, or cotter pins, in addition to tapered or straight bolt fasteners that are either threaded or otherwise mechanically fastened through-to the vertical connecting structure.

Figure 12:
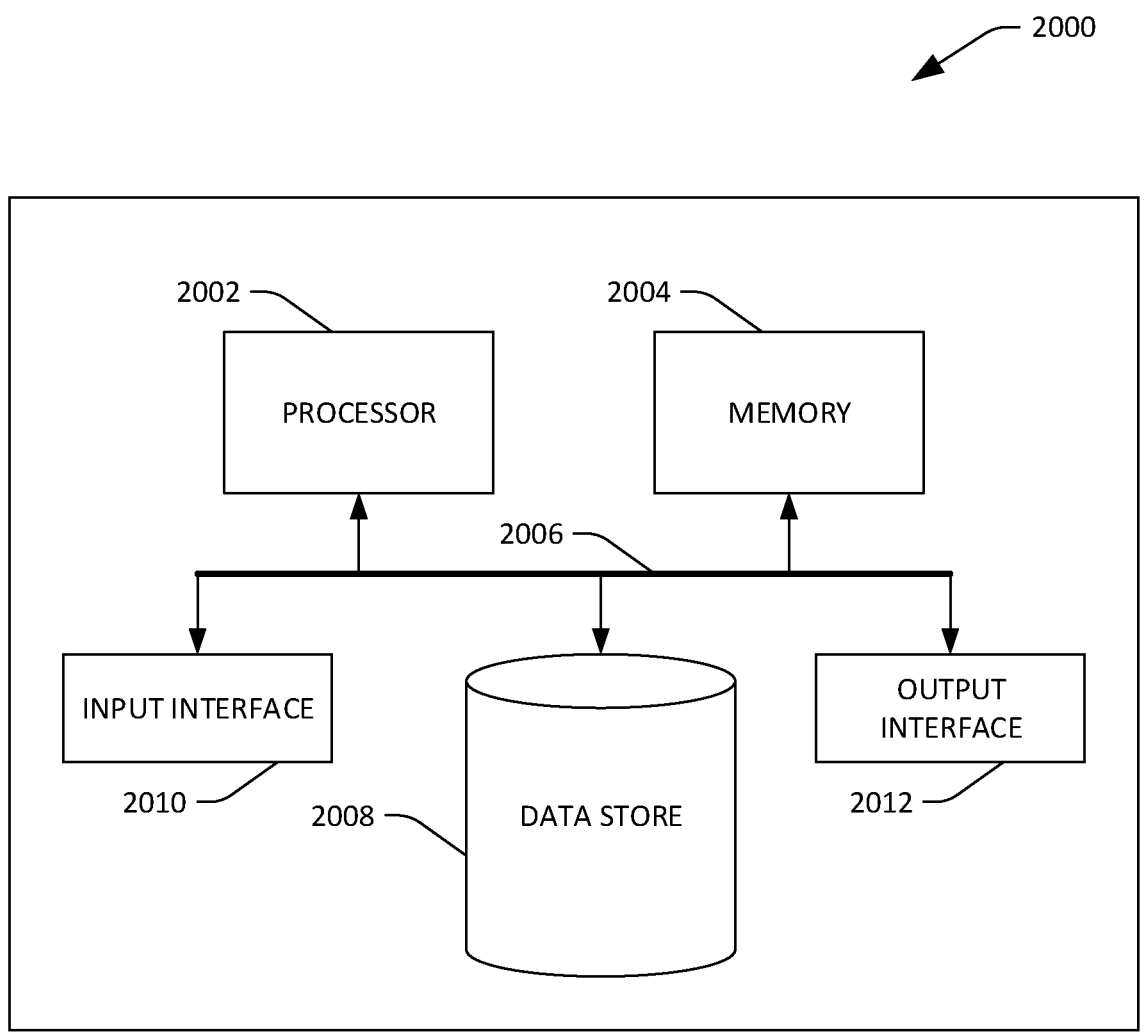
FIG. 12 is a schematic of an example computing device for use in the methods and devices described herein.

Referring now to FIG. 12, an illustration of an exemplary computing device 2000 that can be used in accordance with the sport ball training device disclosed herein is illustrated. In an example, FIG. 12 is an example of a computing device interfacing with the apparatus of FIG. 2.

The computing device 2000 includes data storage 2008 that is accessible by a processor 2002 by way of the system bus 2006. The data storage 2008 may include executable instructions to operate the processor 2002 and other components. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc. by way of the output interface 2012. In another example, the computing device 2000 may display a visual simulation of a soccer video game, a football video game, a rugby video game, a golf video game, a kickball game or another game played with a ball that is kicked or struck by way of the output interface 2012.

It is contemplated that the external devices that communicate with the computing device 2000 via the input interface 2010 and the output interface 2012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the term "system" is intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 13:
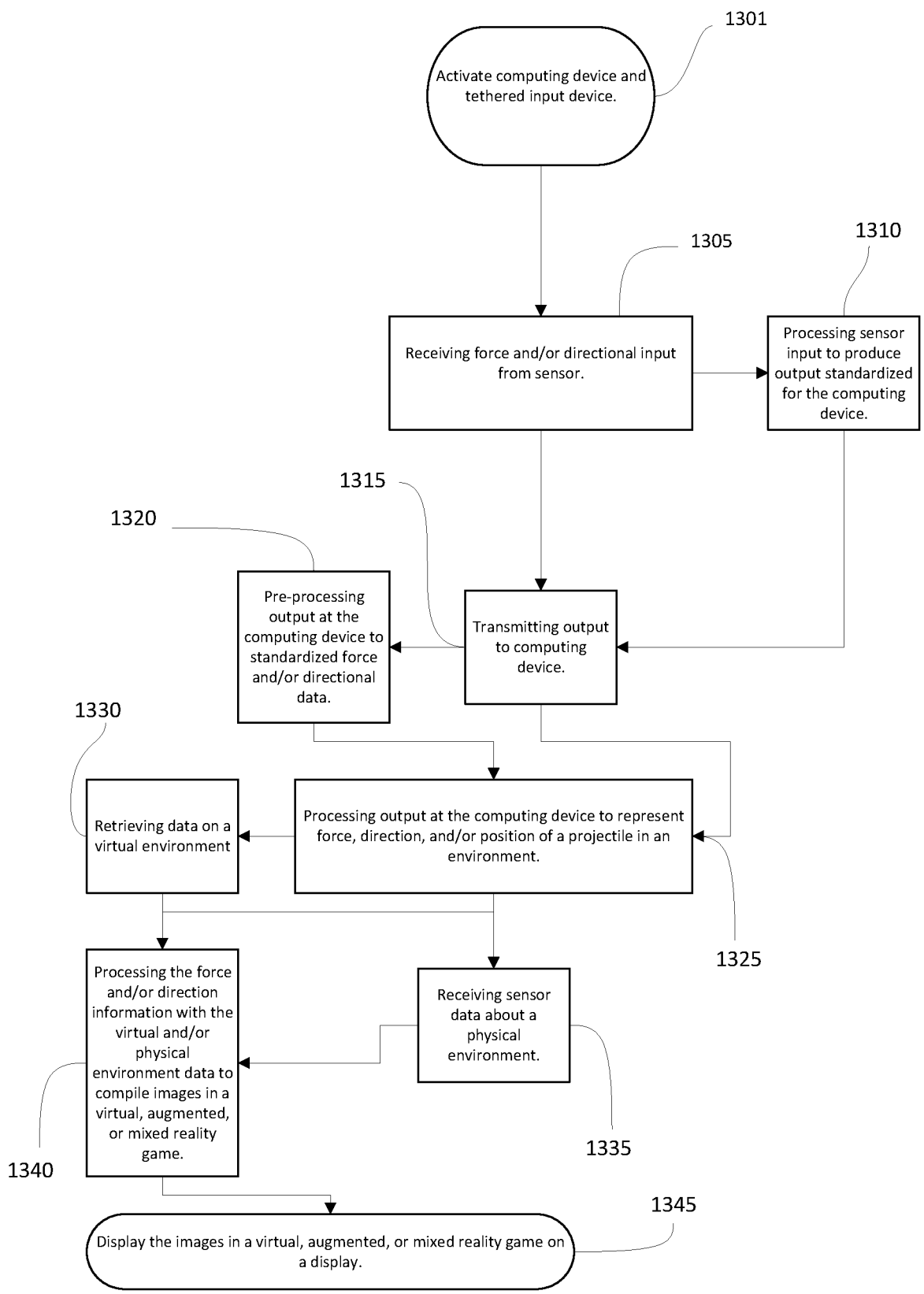
FIG. 13 is a flow chart showing a computer-implemented method for virtual, augmented, or mixed reality gaming.

FIG. 13, shows an example of a method of operating a tethered projectile input device, such as the ball training device 100 disclosed above with a computing device. At step 1301 the computing device and input device are activated, i.e., powered on. The ball being physically tethered to a fixed location means it can be moved but is tethered to its original location so it will return there, automatically in the case of the devices disclosed above through the action of the motion transfer member.

As disclosed above, the tethered input device has a sensor associated with it, either inside it, on its surface, or external sensors that detect its movement and/or impacts against it. At step 1305 force and/or directional information from the tethered projectile input device are received by a sensor. This could be a force applied to a surface of the ball, a movement detected by an internal sensor, or a movement detected by an external sensor. It could also be an impact detected by a sensor in the base, such as the base in front of the projectile. In an embodiment, directional and other action input is provided through a game controller. This game controller input can be combined with the directional and/or force input from the tethered input device at step 1305 or it can be separately transmitted to a gaming system through another wired or wireless transmission channel. In the case of the former, the game controller could have a wired or wireless interface with a housing associated with the tethered input device.

At step 1315 output from the sensor is transmitted to the computing device. This can be through wired or wireless connection. In an embodiment, it can be transmitted over the internet to a remote computing device. In an embodiment, at step 1310, the sensor input is processed prior to being transmitted to the computing device at step 1315 as standardized output for the particular computing device. For example, the sensor input can be processed at the tethered input device to transform the raw sensor data into data adapted for controller input to a particular computing device such as a dedicated gaming system. Particular formatting for input devices may be required for compatibility with certain computing devices. Step 1315 allows for this. This may involve separating vector data into directional and force (magnitude) data or vice versa. It may involve processing positional information into directional and force data. This may involve other codifying of information in particular formats for the computing device protocols.

At step 1320, pre-processing or formatting of the data output from the sensor is performed. This may be done on a computing device or processor in the tethered input device, such as in the base, or it could be associated with the sensor where the sensor is located. This step may take place if the sensor data is not processed before transmitting to the computing device and may involve the types of processing mentioned for step 1315.

At step 1325, the pre-processed or formatted sensor output (from either step 1310 or 1320) is processed to determine force, direction, and/or position of a projectile in an environment. The force, direction, and/or position of a projectile may be associated with a tethered starting point in the environment. This point's reference in the environment may be continuously updated based on other input, such as momentum data from a prior movement of the tethered input device, or other input from instructions for a game or simulation in memory.

At step 1330, data is retrieved from memory that is associated with the virtual environment. In an embodiment, this may include dimensions of a virtual environment, such as a playing field area or volume, or graphical representations of the environment, including moving and active parts of the environment. In this step the data on the environment is contained in memory and may be loaded into memory from the internet. Streaming data from the internet can also be retrieved and processed into the virtual environment.

At step 1335, instead of retrieving data for a virtual environment, at least some data is retrieved from sensor data in the physical environment (i.e. the real world). For example, this may be objects in a room as the user is using the tethered projectile, and/or objects from a different physical location. For example, a real world stadium environment may be sensed and received by sensors in that environment as it is transmitted to the computing device. In another example, a real world object or objects, such as a kicking target in a room, other persons, surfaces, walls, or floor of a room or device, are sensed and transmitted to the computing device. In an embodiment, the objects may be in a remote room or location from the tethered input device.

Steps 1330, 1335, and 1325 can operate simultaneously or in different order than they are presented.

At step 1340, the computing device processes the processed force and/or direction information with the virtual and/or physical environment data from the prior steps to compile images in a virtual, augmented, or mixed reality game. In a mixed reality game, the environment data would be acquired from both steps 1330 and 1335. In an augmented reality game, the environment data would be at least primarily acquired from step 1335.

In an example, the position of the projectile may be modified by a wind speed vector in memory or some other obstacle or force acting on the projectile. This can be conveyed by either a sensor or data in memory associated with a virtual environment. For example, in a golf simulation, the tethered input device could be located outside or in a simulation chamber where real or generated wind is present. The sensor could transmit this information to the computing device to be processed along with other environment data.

At step 1345, the images are provided to a user through a display, such as a display screen or a headset. In an embodiment, the images may be presented as a 360 degree display (in a lateral field or in all directions). This can be done as a projection onto walls, floors, and/or ceilings of the user's room, in a headset, or through one or more display screens mounted around the room. A mirror-backed display or a holographic display could also be used as a display. In an embodiment, the display will show a golf ball on ground or a ball rolling toward the user for kickball.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and BLU-RAY (BD), where disks usually reproduce data magnetically and discs usually reproduce data optically with lasers. Further, in an example, a propagated signal is not included within the scope of computer-readable storage media or display data. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as, infrared, radio, and microwave, then the coaxial cable, fiber optic cable, twisted pair, DSL, or wireless technologies such as, infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

FIG. 14 shows an alternative embodiment where the motion transfer member is an elastomeric arm 1406 that stores energy when a kick or strike is applied, and then release the energy after the kick or strike to bring the modified ball 1402 back to an initial starting position.

The elastomeric arm may be constructed of a polymeric or polymeric hybrid material, such as vulcanized rubber compositions, such as, natural rubber, polybutadiene rubber, or styrene-butadiene rubber, silicone rubber, or a fiber-reinforced hydrogel material (see Agrawal, et al., "Strong fiber-reinforced hydrogel," Acta Biomaterialia, Volume 9, Issue 2, February 2013, Pages 5313-5318; and Yiwan Huang et al. Energy-Dissipative Matrices Enable Synergistic Toughening in Fiber Reinforced Soft Composites, Advanced Functional Materials (2017). DOI: 10.1002/adfm.201605350, both of which are incorporated herein by reference.) In an embodiment, the elastomeric material may have a shell and core assembly, wherein the core is made of a flexible and elastomeric material having a greater stiffness as compared to the material of the body thereby providing additional rigidity, but still allowing deformation of the sidewall of the arm. In an embodiment, the elastomeric arm 1406 has a modulus of elasticity (Young's modulus) of 0.1 to 1.5 GPa, such as 0.3 to 1.1 or 0.5 to 1.

The elastomeric arm 1406 may have a symmetric, asymmetric or irregular cross-section. As assembled in the ball training device 1401, the elastomeric arm may have a narrower cross-sectional diameter in the direction associated with a forward strike. Example cross-sections are oval, hollow-oval, circular, hollow-circular. FIG. 14 shows a two-cord braided or twisted design that may implement two elastomeric cords physically braided or twisted together and able to move and twist independently to a degree. Alternatively, the braided or twisted design can be molded together as a unitary member. The braided design increases surface area for adhesive bonding and a friction fit. In an embodiment, the elastomeric material may be a bungee cord material. In an embodiment, the elastomer arm 1406 can have a shape similar to the double-conical spring with a greater radius in the middle.

In FIG. 14 an exemplary embodiment of the ball training device 1401 is shown in a partial cross-sectional view. The elastomeric arm 1406 has a top portion 1420 and bottom portion 1422. The bottom portion 1422 is enlarged in diameter compared to the top portion 1420.

The elastomeric arm 1406 extends through an inner portion of the modified ball 1402, in this case on a vertical trajectory through the axis 118. The top portion 1420 of the elastomeric arm 1406 is coupled to an interior of a modified ball 1402. The coupling may be via adhesive to the interior of the modified ball 1402. It may also be attached as disclosed in other embodiments described herein. At the bottom of the modified ball 1402, a stiff ring 1423, made of e.g., PVC is adhered to the modified ball 1402, and the elastomeric arm 1406 is inserted therethrough. This ring 1423 provides additional durability to the prevent the elastomeric arm 1406 from wearing against the ball, which may be a foam or rubber bladder material.

The bottom portion 1422 of the elastomeric arm 1406 is seated within the base 1404. The base 1404 is hollowed out to fit the contours of the bottom portion 1422, and a channel 1451 is formed in the back of the base 1404. The channel 1451 is configured to be wider than the widest portion of the top portion 1420 of the elastomeric arm 1406. In an embodiment, there is clearance of 0.1 to 2 cm, e.g., 0.2 to 1 cm, or 0.3 to 0.8 cm on either side for the top portion 1420 of the elastomeric arm to bend down and fit into the channel 1451 when the ball is struck. It should be noted that the elastomer arm 1406 allows for significant travel of the modified ball 1402 to the sides even down to 100 degrees (e.g., 50 to 90, or 55 to 80 degrees) of tilt, but the channel 1451 allows for striking with extra force in the straight ahead direction with less wear and tear on the components.

The bottom portion 1422 is further secured to the base 1404 by a bottom plate secured to the bottom of the base 1404 by fasteners, in this case screws. This forces the bottom portion 1422 into a tight seating in the base 1404 holding it in place as the modified ball 1402 is kicked or struck and the top portion 1429 of the elastomeric arm 1406 is bent down to through the channel 1451. This base configuration can also be used with a spring that has a larger bottom portion than a top or mid portion.

In an embodiment, the base 1404 has a small footprint (e.g., 6 to 25 square inches, such as 9 to 16 square inches), and can be attached to a portion of a larger base, such as those forms disclosed above. In fact, multiple different modified balls on a bases similar to base 1404 can be interchanged with a larger base. The attachment mechanism can be include the tongue and groove joints, such as in the modular base of FIG. 9, a screw, a bolt, bolt and nut, a clamp, or other fastening methods known in the art may instead or additionally be used to secure the smaller base 1404 to provide interchangeable modified balls to the larger, heavier base. In an embodiment, the entire base 1404 and larger base can be molded as a single unit.

Figure 15:
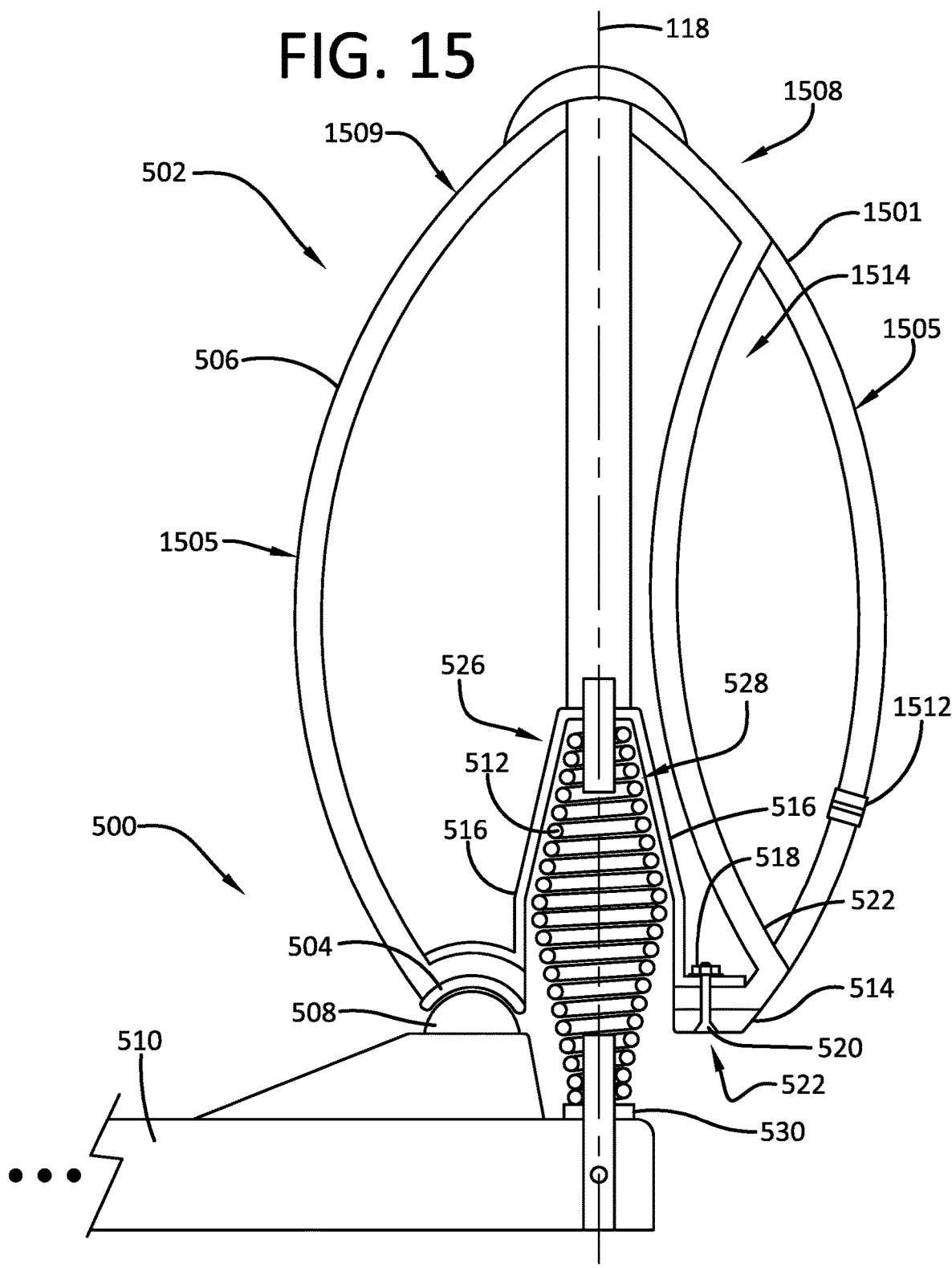
FIG. 15 is a cross-sectional diagram of an exemplary ball training device.

FIG. 15 discloses a modified ball 1506 similar to FIG. 5, but illustrates a rear shell 1501 on the back half 1508 (i.e., the lateral side opposite the striking surface side) that is opposite the front half 1509 (i.e., the side configured for striking). The modified ball 1506 has an exterior outward-facing surface 1505. By exterior outward-facing surface 1505, it is meant a surface that faces outwardly from the axis 118 or is otherwise not blocked by other features from the exterior of the modified ball 1506. This term should not be construed to mean an interior feature or surface.

The rear shell 1501 is made of a flexible or readily deformable material. In an embodiment, the rear shell 1501 is configured to have some stiffness that allows it to approximate the look of a symmetrical ball, but have very little bounce-back elasticity or a rebound damping feature. This configuration may include an interior chamber 1514 defined at least partially by the rear shell 1505, and interior parts of the modified ball. The interior chamber 1514 may be air filled at low pressure and have a two-way pressure release valve 1512 that allows quick deflation and slow inflation at atmospheric pressure. This serves to allow the back half 1508 In an embodiment, this rear shell 1501 is made of leather or a semi-flexible plastic, and can match the material on the front half 1509 of the modified ball 1506 to improve aesthetics.

The rear shell 1501 may be configured with a mechanism, e.g., a spring, such as a leaf spring with a low compressive and rebound strength that is sufficient push out a central portion of the rear shell 1501 without substantially contributing to a rebound effect when the modified ball 1506 is struck. A collapsible and impact dampening material such as memory foam (viscoelastic polyurethane) could also be used to fill the chamber 1514.

In an embodiment, the modified ball 1506 can be configured as in FIG. 4, with an inner and outer layer, wherein the outer (exterior outward-facing surface 1505) for example, may be leather or a simulation leather material and extends the entire un-truncated, generally symmetrical lateral surface of the ball, including the back half 1508 of the modified ball 1506, while the inner layer is laterally truncated at the back half 1508 as described herein. (Lateral meaning generally perpendicular to the axis 118 or radial.) The outer layer in this embodiment, would also be a readily collapsible/deformable material as described above. As described above, the outer layer 402, for example, may be leather or a simulation leather material, while the inner layer 404 is a polyurethane or other cellular foam. For example, with an ILD of 5 to 25, such as 7.5 to 15.

Figure 16:
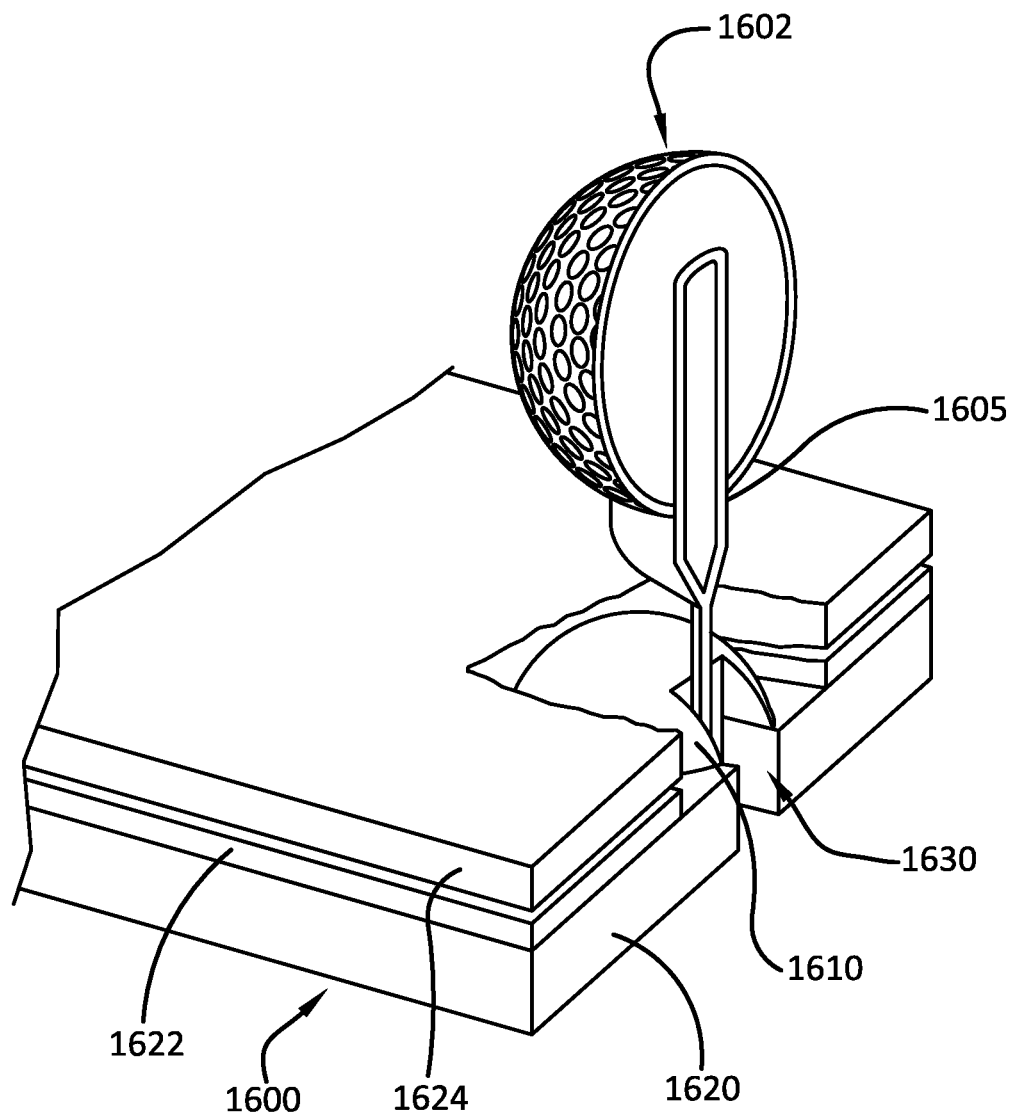
FIG. 16 is perspective view of a golf training device.

FIG. 16 is a perspective view of a golf training device 1600 including a modified golf ball 1602 and a rigid motion transfer member 1605. The golf training device 1600 further includes a rigid base 1620, in this case, made of plexiglass, and multiple layers of turf, e.g., a first layer 1622 and second layer 1624 of synthetic turf. Other layers can also be added. The bottom of the second or additional synthetic turf layers 1624, may be reinforced with a rigid material to prevent a too soft surface for standing on. A strike guard 1610 and receiving channel 1630 are also provided.

The rigid motion transfer member 1605 may be made of metal, such as aluminum, iron, or steel, or a hard plastic. At its bottom terminal end, it is attached to a pivot mechanism. (See e.g. FIG. 19) For example, this can be a bolt anchored at both ends in the base 1620 for a one dimensional pivot or some other pivoting attachment mechanism, e.g., a hinge. In an embodiment, the pivoting mechanism allows pivoting or movement in more than one dimension, such as a universal ball joint. In the latter case, the receiving channel 1630 can be wide, e.g. covering a 30 to 180 degree arc, e.g. 45 to 90, or 50 to 80 degree arc.

The rigid motion transfer member 1605 is anchored, by adhesive or a mechanical connector, e.g., a bolt, shaft, or pin, to a central area at the bottom (FIG. 16) or back (FIG. 18A/18B) of the modified golf ball 1602. In an embodiment, the rigid motion transfer member 1605 can be anchored at the side of the modified golf ball 1602.

Figure 17:
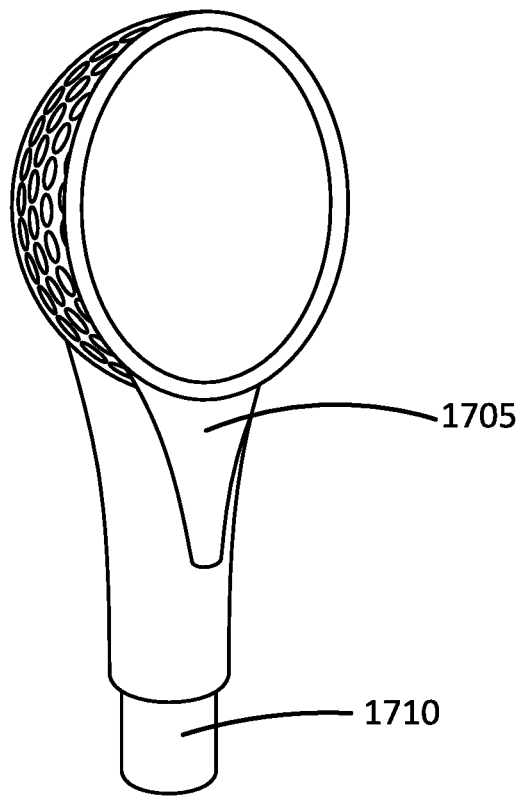
FIG. 17 is a perspective view of an example modified golf ball.
Figure 18A:
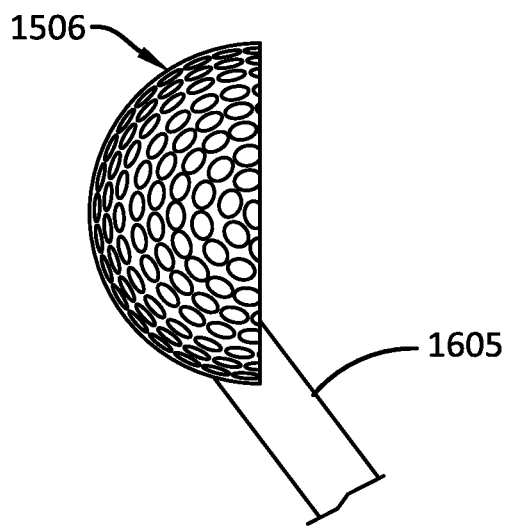
FIGS. 18A and 18B are lateral views of an example modified golf ball.
Figure 18B:
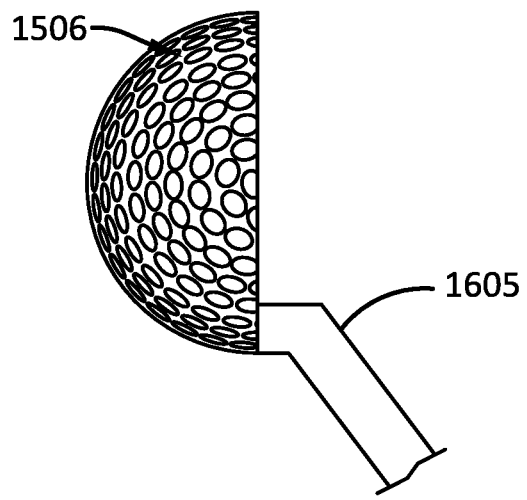

An understrike guard 1610, made of, e.g., a high-strength elastomeric material is coupled to the base 1620 and protects the rigid motion transfer member 1605 and golf club from excessive contact. To further promote keeping the club from the rigid transfer member 1605, in an embodiment as shown in FIGS. 18A and 18B, the rigid motion transfer member 1605 may be angled forward. See also the angled alignment of the rigid motion transfer member in FIG. 19. In yet a further embodiment, the rigid motion transfer member 1605 can be protected with an elastomeric sleeve, or a double sleeve (telescoping or otherwise), with a top sleeve 1705 overlapping a bottom sleeve 1710. (See FIG. 17.) The triangular portion on the top sleeve 1705 illustrates a cut away portion of the top sleeve 1705, making a smooth flat surface. The top sleeve 1705 is anchored to the bottom sleeve 1710 the bottom of the modified golf ball 1605 and abuts the bottom of the modified golf ball 1605. The bottom sleeve 1710 extends below the understrike guard 1610 and may be anchored to the base 1620, the guard 1610, and/or the top sleeve 1705.

The multi-layered turf system allows for an adjustment of the ball height off the hitting surface. A tee shot may equate to just one layer of turf, while additional layers may be used to mimic different levels of tee heights, e.g., 1, 2, or 3 inches. In an embodiment the hitting surface is raised to be level with the bottom of the modified golf ball 1602 as on a fairway. In an embodiment, the hitting surface may be raised even above the bottom of the modified golf ball 1602, and longer stranded turf, e.g. 0.5 inch to 3 inch, or 1 inch to 2 inch may be used to approximate a rough.

To allow for a full follow-through strike without a rebound occurrence (i.e., the ball hitting the base or floor and rebounding up to hit the club on its follow-through path, a receiving channel 1630 is cut into the guard 1610 and base 1620. The receiving channel 1630 is configured to receive the rigid motion transfer member 1605 and allow it drop down to an angle at or near parallel to the flat base 1620, such as within 5, 10, or 15 degrees parallel to the base 1620. In an embodiment, the modified golf ball 1602 drops below the base 1620 and first (bottom) layer of turf 1622, for example, 50% to 100%, or 60% to 75%, or 70% to 95% of the modified golf ball 1602 drops below the base. In an embodiment, the modified golf ball 1602 drops below the tallest portion of the guard 1610 into the receiving channel 1630. In an embodiment, in order to keep the device height, especially the standing surface, comprising the base 1602 and turf 1622, 1624 to a minimum height, the receiving channel 1630, may be a hole that is open at the bottom of the base 1602.

To reduce weight and enhance portability and storage, through various features disclosed herein, the base 1602 height can be kept to minimum height of one inch or less, e.g., 0.9 inches to 0.3 inches or 0.8 inches to 0.5 inches. The base 1602 can also have taller more traditional heights, e.g. 1.5 inches to 4 inches, or 2 to 3 inches.

Although not shown here, in another embodiment, the base is extended further ahead of the modified golf ball 1602, and the receiving channel 1630 extends as well and includes a cut out for the golf ball 1602 so it can travel down into the turf layers 1622, 1624 and base 1620. It should be understood that base 1602 or standing surface can be modular and split into parts, for example, as disclosed herein.

The base 1620 can be provided with suction cups for hard flooring, a top portion of which may be recessed into the bottom of the base 1620, to keep the height of the base as low as possible. The suction cups may include a locking lever for more secure placement. In an embodiment the base can include spikes for carpeted floors.

Once the rigid motion transfer member 1605 has been struck down, it is desirable to reset it to the upright position, e.g. as shown in FIG. 16. This could be done manually or with a club, but in an automated embodiment, a reset mechanism can be utilized. The reset can be triggered by a mechanical button push, e.g. foot-operated and mounted to the base 1602, or an optical/infrared trigger. A spring-loaded ratchet mechanism coupled to or integrated as part of the pivoting mechanism may be used for this purpose. When the mechanical button is activated, a release bar would be lifted from the ratchet and a spring would pull the rigid motion transfer member 1605 from the struck down position to the upright position. This release could also be triggered electronically, or optically or with an infrared sensor when a club or foot or hand is passed over the sensor. The racheting mechanism can also help recenter and set the modified golf ball 1602 in a vertical position. In another embodiment, a one-way ratchet, gear, sprocket or other latching device, either spring-loaded or mechanically operated can be used in place of the ratchet mechanism.

Figure 19:
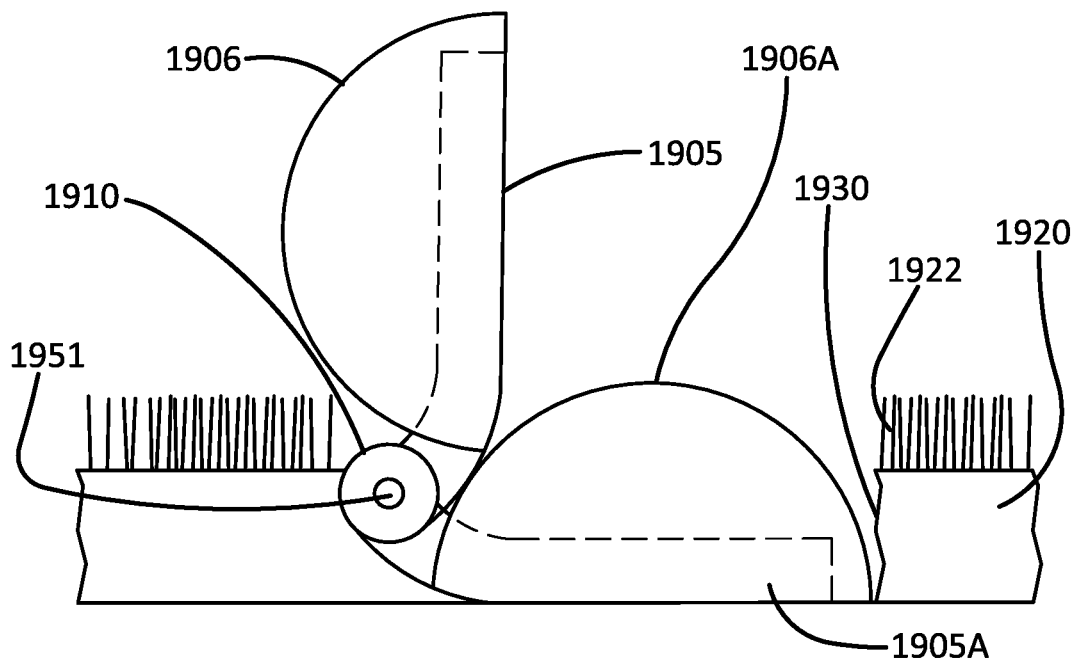
FIG. 19 is a side elevation cross-sectional view of an embodiment of an exemplary golf simulation or training device.

Referring now to FIG. 19, a golf ball training device similar to that shown in FIG. 16 is disclosed. Here, the modified ball 1906 is mounted on a motion transfer member 1905 that is angled to a pivot 1951 (e.g., a gear, a pin shaft, or a rotating hinge) that is set forward from the center of a corresponding untruncated ball, or forward from the vertical axis of the motion transfer member 1905, (i.e., the axis running the longest length of the motion transfer member 1905). The pivot point 1951 is located just below the top surface of the base 1920. In this embodiment, it is desirable to have the pivot 1951 be anchored as near as possible to the top of the base, and just below the top of the turf 1922, so as to simulate a ball lying on the fairway. A guard 1910 is anchored just above the pivot point, abutting the modified ball 1906. This is made an elastomeric material selected from those disclosed herein and protects the pivot 1951 from club strikes.

Also in FIG. 19, a second instance of the modified ball 1906A is shown in its struck down state lying in the receiving channel 1930 with the rigid motion transfer member 1906 at the bottom of the channel 1930.

Figure 20:
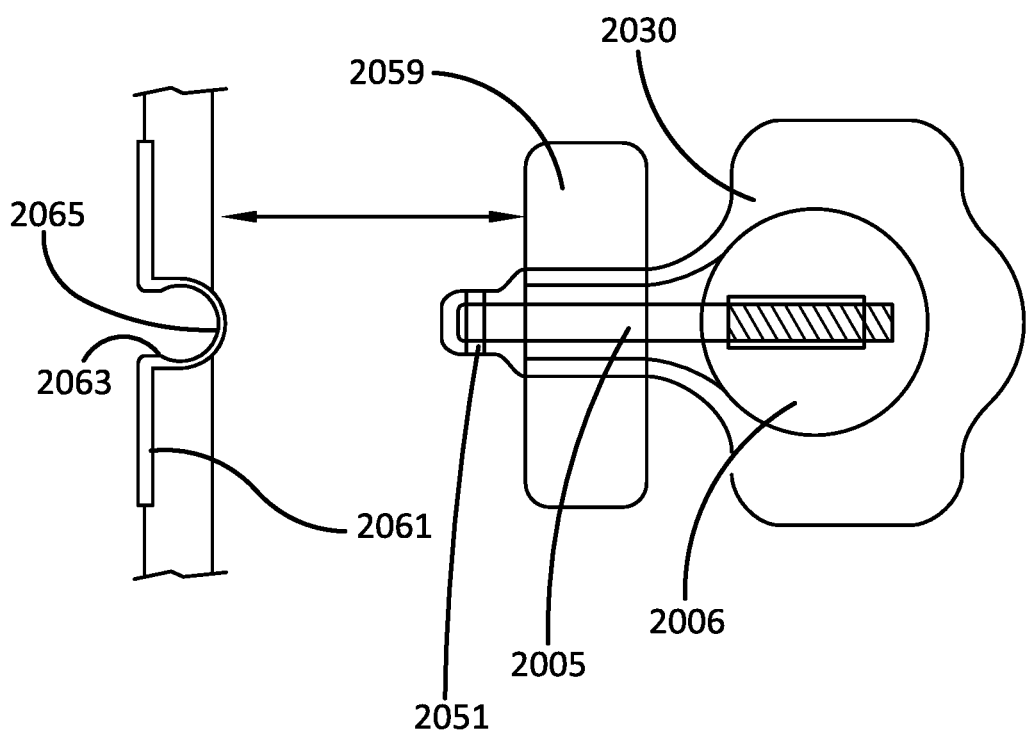
FIG. 20 is a side cross-sectional view of a catch cradle mechanism and a top-down cross-sectional view of a portion of an exemplary golf simulation or training device.

FIG. 20 discloses a configuration to prevent rebound or kick-back of the modified golf ball. This is desirable, especially for high-velocity applications such as a golf club striking a golf ball. Unlike some other balls disclosed herein, golf balls (even modified to remove part of the back of them) have a high rebound property, travel at a high velocity (e.g., 75 to 200 mph) and may be particularly suitable for additional solutions to prevent kick-back into the arc of the follow-through of the swing. FIG. 20 discloses a side cross-sectional view of a catch cradle 2061 mechanism and a top-down cross-sectional view of the modified ball 2006 and motion transfer member 2005 lying in the struck-down state in the receiving channel 2030. The arrow indicates where the catch cradle 2061 will sit in an inset 2059 in the bottom of the receiving channel 2030.

The catch cradle 2061 acts to receive the motion transfer member 2005 through the lips 2063 on either side of its entry way. The lips 2063 are of a slightly deformable material, e.g. plastic, or metal, and are configured to flex to allow the motion transfer member 2005 to enter with the high initial strike force but to be retained from leaving against the rebound force. The player can then manually reset the modified ball 2006 to the vertical pre-strike position by hand or with the club.

With reference again to FIG. 16, the ratcheting mechanism can also act to lock down the modified golf ball 1602 into the base as it is struck, preventing rebound or kick-back of the modified golf ball 1602 from causing interference with the follow through of the club strike. In other embodiments, the modified golf ball 1602 or rigid motion transfer member 1605 may have a permanent magnet or ferromagnetic material embedded in it, and this is paired with a permanent magnet or electromagnetic, or ferromagnetic material at the bottom of the receiving channel 1630. It may be beneficial to have the permanent or electromagnet at the bottom of the receiving channel 1630 and only a ferromagnetic material on the rigid motion transfer member 1605 or modified golf ball 1602. This would help prevent magnetic interactions with the metal club. As most permanent magnets are brittle, a cushion, e.g. a rubber or foam coating would be beneficial in maintaining the integrity of the permanent magnet against repeated strokes. In the case of an electromagnet, a reset mechanism as described above could be used to turn off the electromagnet to allow the modified golf ball 1602 to reset.

Other mechanisms for preventing kick-back include a hook and loop backing, such as VELCRO for the modified golf ball 1602, with a paired hook and loop patch at the bottom of the receiving channel 1630.

Figure 21:
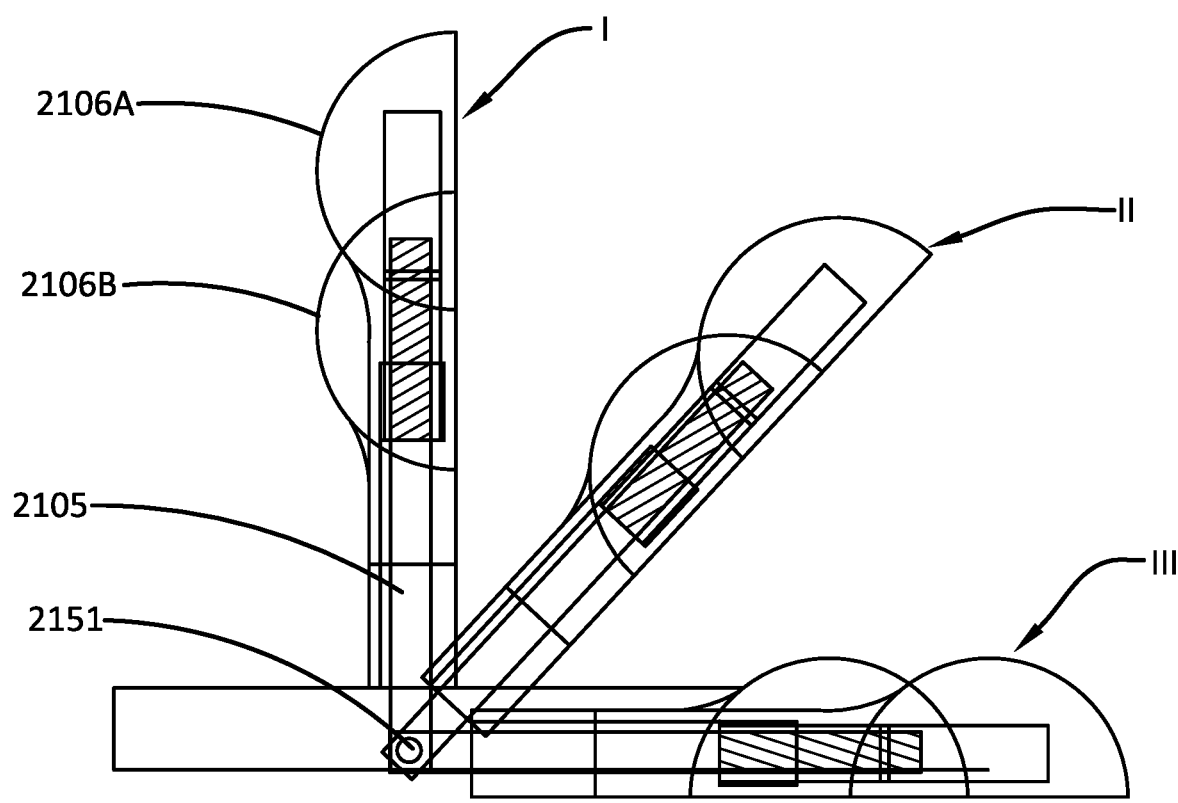
FIGS. 21 to 23 are side cross-sectional views of an exemplary adjustable height modified golf ball.
Figure 22:
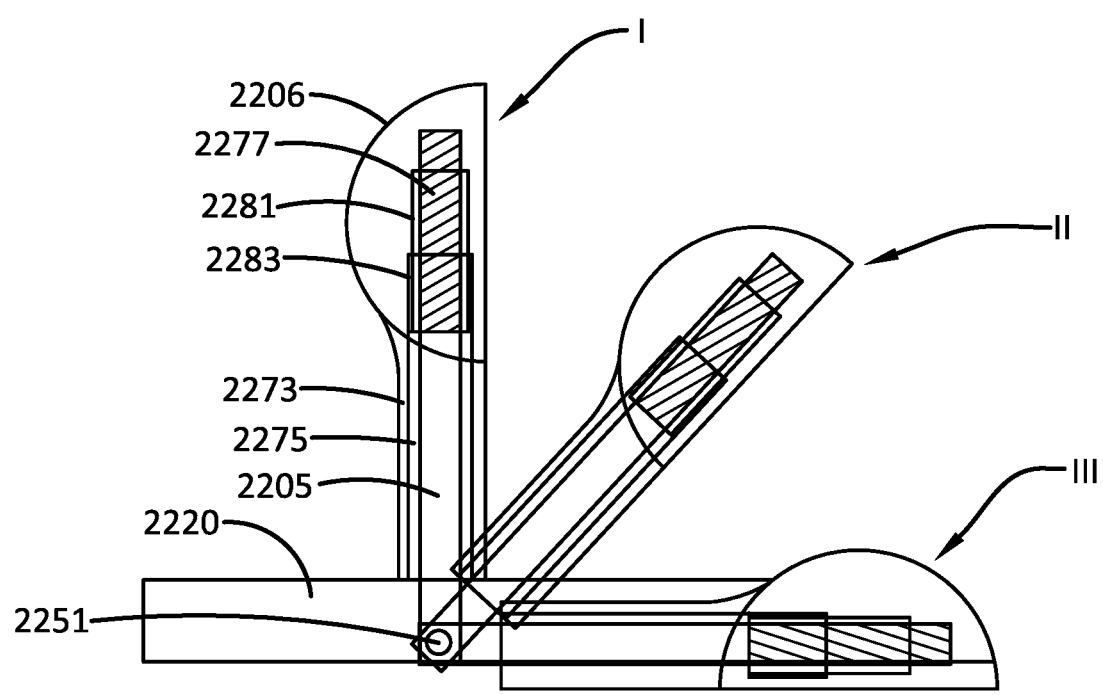
Figure 23:
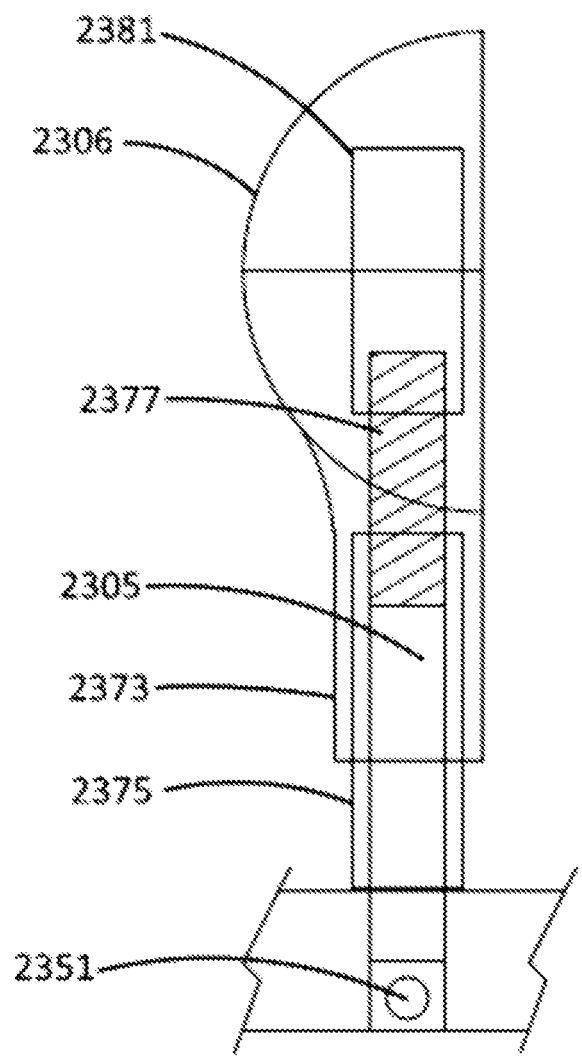

FIGS. 21-23 are side-elevation cross-sectional views of embodiments of the modified golf ball and training or simulation device similar to those of FIG. 19, but that has an adjustable height. FIG. 21 shows the modified golf ball 2106 in a first 2106A and second 2106B configuration, and in three states of motion, vertical (pre-strike) I, mid-motion II, and horizontal (strike-down) III. In an embodiment, the ball or any part of the device does not extend above the top plane of the hitting mat (turf or base) more than 0.35 inches, such as 0 to 0.25 inches, or 0.01 to 0.1 inches. The multiple height settings are to simulate different tee heights and can work in conjunction with multiple layers of synthetic turf as disclosed above to create various levels of height for the modified ball 2106 off the surface.

FIG. 22 shows a modified ball 2206 at a lowest height, and again at the three lowest heights I, II, III. The modified golf ball 2206 is coupled to the rigid motion transfer member 2205 in a height adjustable manner. A top sleeve 2273 is anchored to the modified ball 2206, and a bottom sleeve 2275 is anchored to the base 2220. When adjusting the modified ball 2206 to a higher setting the overlapping sleeve parts 2273, 2275 slide partially apart. In this embodiment, the top of the rigid motion transfer member 2205 is threaded 2277 and engaged into first and second sleeves 2281, 2283 embedded and anchored to the modified golf ball 2206 and extending into the modified golf ball 2206. The height of the modified golf ball 2206 from the base 2220 can be changed by spinning it around on the threads.

FIG. 23 shows the modified golf ball 2306 at its highest height with a threaded top 2377 of the rigid motion transfer member 2305 received into a top sleeve 2275 that is anchored in the interior of the modified golf ball 2377. When adjusting the modified ball 2306 to a higher setting the overlapping sleeve parts 2273, 2375 slide partially apart. The height of the modified golf ball 2306 from the base 2320 can be changed by spinning it around on the threads.

In both FIGS. 22 and 23 a detent, thread interruption, or other stop and lock mechanism can signal predefined heights, e.g., 1 inch, 2 inch, and 3 inch heights that can be felt by the user when turning and function to hold the modified golf ball 2306 in alignment after the club strike.

In another embodiment, instead of a threaded spinning mechanism, the height can be adjusted by a telescoping arrangement with multiple parts sliding telescopically. A threaded turn, a channel linking the telescoping parts, or some other stop and lock mechanism can be provided to prevent the modified golf ball 2206, 2306 from turning radially when hit by a club strike. In another embodiment, the modified golf ball 2206, 2306 incorporates a ratcheting ladder mechanism, whereby a one-way locking gate opens when moving the ball upward and closes to prevent it from falling back until a release lever is activated.

It should be noted that the features disclosed and illustrated for use with the modified golf ball may be combined with other sports balls and devices disclosed herein and vice-versa.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a", "an", and "the" should be interpreted to mean "one or more" unless the context indicates the contrary.

It is claimed:

1. A system comprising:
   a modified ball;
   a base;
   a motion transfer member at least partially extending into the modified ball, the modified ball is coupled to the base via the motion transfer member;
   a sensor configured to receive input when a user interacts with the modified ball; and
   a computing device configured to receive input from the sensor;
   wherein the motion transfer member comprises a universal joint configured for transferring motion in more than one dimension, and a ratchet mechanism coupled to or integrated as part of the motion transfer member.

2. The system of claim 1, wherein the sensor is housed within an internal hollow of the modified ball.

3. The system of claim 1, further comprising a display, wherein the computing device is in communication with the display, wherein input provided by a user interacting with the modified ball is depicted on the display.

4. The system of claim 1, wherein the computing device is running a video game depicting a simulation of the modified ball.

5. The system of claim 1, wherein the base is configured for a user to at least partially stand on the base to kick the modified ball.

6. The system of claim 1, wherein the sensor is on an exterior layer of the modified ball or is on the base and configured to detect impacts of a back of the ball on the base.

7. The system of claim 1, wherein there are multiple sensors, including a sensor in or on an article configured for wearing on a foot and a sensor in or on the modified ball and configured to register impacts on the ball.

8. The system of claim 1, wherein the motion transfer member is rigid and is configured to drop the modified ball into a recessed receiving channel upon being struck; or the modified ball is configured to be adjusted up or down in relation to the base; or the modified ball has back half including a deformable portion; or wherein the motion transfer member includes a strike guard configured to protect it from an errant strike; or wherein the motion transfer member is rigid and is coupled to the base with a ball joint pivot; or wherein the motion transfer member is configured to be mechanically and automatically reset to a vertical position; or wherein the motion transfer member comprises a diagonal configuration to protect the motion transfer member from an errant strike; or wherein the device includes mechanism for locking down the motion transfer member and/or modified ball, the mechanism configured to prevent the modified ball from rebounding into a follow through arc of a strike on the modified ball.

9. The system of claim 1, wherein the motion transfer member comprises a ratchet mechanism coupled to or integrated as part of the motion transfer member, wherein a motion or positions sensor or accelerometer sensor conveys motion or impact force as input to the computing device.

10. The system of claim 1, wherein the motion transfer member is vertically mounted.

11. The system of claim 1, wherein the motion transfer member is rigid.

12. The system of claim 1, wherein the motion transfer member includes a strike guard configured to protect it from an errant strike.

13. The system of claim 1, wherein the motion transfer member is protected with an elastomeric sleeve.

14. The system of claim 1, wherein the modified ball is held above the base by the motion transfer member.

15. A system comprising:
a modified ball;
a base;
a motion transfer member vertically mounted and at least partially extending into the modified ball, the modified ball is coupled to the base via the motion transfer member;
a sensor configured to receive input when a user interacts with the modified ball; and
a computing device configured to receive input from the sensor;
wherein the motion transfer member comprises an elastomeric arm.

16. The system of claim 15, wherein the motion transfer member has a shell and core assembly.

17. The system of claim 15, wherein the motion transfer member comprises a rigid member that is coupled to the base with a ball joint pivot.

18. The system of claim 15, wherein the modified ball is held above the base by the motion transfer member.

* * * * *